US012302401B2

(12) United States Patent
Murray et al.

(10) Patent No.: US 12,302,401 B2
(45) Date of Patent: May 13, 2025

(54) APPARATUS, SYSTEM AND METHOD FOR PERFORMING TWO-STEP RACH

(71) Applicant: InterDigital Patent Holdings, Inc., Wilmington, DE (US)

(72) Inventors: Joseph M. Murray, Schwenksville, PA (US); Pascal M. Adjakple, Great Neck, NY (US); Lakshmi R. Iyer, King of Prussia, PA (US); Mohamed Awadin, Plymouth Meeting, PA (US); Patrick Svedman, Stockholm (SE); Qing Li, Princeton Junction, NJ (US); Allan Y. Tsai, Boonton, NJ (US); Yifan Li, Conshohocken, PA (US); Rocco Di Girolamo, Laval (CA); Zhuo Chen, Claymont, DE (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 450 days.

(21) Appl. No.: 17/628,748

(22) PCT Filed: Aug. 4, 2020

(86) PCT No.: PCT/US2020/044830
§ 371 (c)(1),
(2) Date: Jan. 20, 2022

(87) PCT Pub. No.: WO2021/026118
PCT Pub. Date: Feb. 11, 2021

(65) Prior Publication Data
US 2022/0272760 A1     Aug. 25, 2022

Related U.S. Application Data

(60) Provisional application No. 62/882,565, filed on Aug. 4, 2019.

(51) Int. Cl.
*H04W 74/0833*  (2024.01)
*H04W 74/0836*  (2024.01)
(Continued)

(52) U.S. Cl.
CPC ... *H04W 74/0833* (2013.01); *H04W 74/0836* (2024.01); *H04W 36/085* (2023.05);
(Continued)

(58) Field of Classification Search
CPC .......... H04W 74/0833; H04W 36/085; H04W 36/13; H04W 74/08
See application file for complete search history.

(56) References Cited

U.S. PATENT DOCUMENTS 10,433,342 B2    10/2019 Akkarakaran et al.
10,693,605 B2     6/2020 Islam et al.
(Continued)

FOREIGN PATENT DOCUMENTS

CN    109845378 A    6/2019
CN    109845385 A    6/2019
(Continued)

OTHER PUBLICATIONS

LG Electronics Inc: "Criteria for 2-step RACH selection", 3GPP Draft; R2-1906580 Criteria for 2-Step RACH Selection, 3rd Generation Partnership Project (3GPP), Mobile Competence Centre ; 650, Route Des Lucioles ; F-06921 Sophia-Antipolis Cedex ; France, vol. RAN WG2, No. Reno, USA; May 13, 2019-May 2019 (Year: 2019).*

(Continued)

*Primary Examiner* — Jutai Kao
*Assistant Examiner* — Bradley D Lytle, Jr.
(74) *Attorney, Agent, or Firm* — Flaster Greenberg P.C.

(57) ABSTRACT

A first apparatus in a wireless communication system, the first apparatus including circuitry configured to trigger a
(Continued)

Random Access Channel (RACH) procedure; select a two-step RACH procedure from among a plurality of RACH procedures as a RACH type to be performed; select a MsgA transmission resource; transmit a MsgA; and monitor for a network response from a second apparatus.

17 Claims, 18 Drawing Sheets

(51) Int. Cl.
    *H04W 36/00*         (2009.01)
    *H04W 36/08*         (2009.01)
    *H04W 74/08*         (2009.01)
    *H04W 74/0838*      (2024.01)

(52) U.S. Cl.
    CPC ............ *H04W 36/13* (2023.05); *H04W 74/08* (2013.01); *H04W 74/0838* (2024.01)

(56) References Cited

U.S. PATENT DOCUMENTS

| | | | |
|---|---|---|---|
| 2013/0083739 A1* | 4/2013 | Yamada | H04W 74/006 370/329 |
| 2014/0376458 A1* | 12/2014 | Ryu | H04W 72/542 370/329 |
| 2018/0124718 A1* | 5/2018 | Ng | H04B 7/15 |
| 2018/0352573 A1* | 12/2018 | Yang | H04W 16/14 |
| 2019/0159149 A1* | 5/2019 | Ryu | H04W 56/0045 |
| 2019/0215706 A1* | 7/2019 | Tsai | H04W 24/04 |
| 2019/0215877 A1* | 7/2019 | Qian | H04L 27/2666 |
| 2019/0297537 A1* | 9/2019 | Tsai | H04W 36/0085 |
| 2019/0320467 A1 | 10/2019 | Freda et al. | |
| 2020/0314724 A1* | 10/2020 | Kyung | H04W 72/21 |
| 2020/0373992 A1* | 11/2020 | Wang | H04B 7/0626 |
| 2020/0374926 A1* | 11/2020 | Shah | H04W 74/0833 |
| 2021/0105828 A1* | 4/2021 | Agiwal | H04L 5/001 |
| 2021/0219349 A1* | 7/2021 | Huang | H04W 74/0833 |
| 2021/0352721 A1* | 11/2021 | Zhang | H04W 72/21 |

FOREIGN PATENT DOCUMENTS

| | | |
|---|---|---|
| CN | 109863814 A | 6/2019 |
| WO | WO 2019/138284 A1 | 7/2019 |

OTHER PUBLICATIONS

3GPP TR 36,889, Study on Licensed-Assisted Access to Unlicensed Spectrum; (Release 13), V13.0.0, Jun. 2015.

3GPP TS 36.213, NR; Physical Layer Procedures for Control (Release 15), V15.6.0, Jul. 2019.

3GPP TS 36.300, (E-UTRAN); Overall description; Stage 2 (Release 15), V15.6.0, Jul. 2019.

3GPP TS 38.211, NR; Physical Channels and Modulation (Release 15), V15.6.0, Jul. 2019.

3GPP TS 38.213, NR; Physical Layer Procedures for Control (Release 15), V15.6.0, Jul. 2019.

3GPP TS 38.300, NR; NR and NG-RAN Overall Description; Stage 2 (Release 15), V15.6.0, Jul. 2019.

Email Discussion Rapporteur (ZTE): "Procedures and mgsB content [105bis#30][NR/2-step RACH]", 3GPP Draft; R2-1906308_REPORTOFEMAILDISC30_ 2-STEPRACH, 3rd Generation Partnership Project (3GPP), Mobile Competence Centre ; 650, Route Des Lucioles ; F-06921 Sophia-Antipolis Cedex France, No. Reno, USA; May 13, 2019-May 17, 2019 May 13, 2019 (May 13, 2019), XPO51729775.

LG Electronics Inc: "Criteria for 2-step RACH selection", 3GPP Draft; R2-1906580 Criteria for 2-Step RACH Selection, 3rd Generation Partnership Project (3GPP), Mobile Competence Centre 650, Route Des Lucioles ; F-06921 Sophia-Antipolis Cedex France, vol. RAN WG2, No. Reno, USA; May 13, 2019-May 17, 2019 May 13, 2019 (May 13, 2019), XPO51730041.

Vivo: "Discussion on the MsgA resource selection", 3GPP Draft; R2-1905655 Discussion on the MsgA Resource Selection, 3rd Generation Partnership Project (3GPP), Mobile Competence Centre ; 650, Route Des Lucioles ; F-06921 Sophia-Antipolis Cedex ; France, vol. RAN WG2, No. Reno, USA; May 13, 2019-May 17, 2019 May 13, 2019 (May 13, 2019), XP051729158.

* cited by examiner

One-to-One Mapping between Preambles and PRUs

Cell Partitioning Based on DL Signal Quality

Many-to-One Mapping between Preambles and PRUs

One-to-Many Mapping between Preambles and PRUs

Request for On-Demand System Information Using 2-Step RACH

BFR Using 2-Step RACH

TDM-ed MsgA Preamble and PUSCH

Failed LBT for MsgA Preamble Transmission with
MsgA Retransmission

Failed LBT for MsgA PUSCH Transmission with Fallback to 4-Step RACH

Scenario using gNB Acquired COT for MsgA Preamble Transmission and UE Acquired COT for MsgA PUSCH Transmission

APPARATUS, SYSTEM AND METHOD FOR PERFORMING TWO-STEP RACH

CROSS-REFERENCE TO RELATED APPLICATIONS

This application is the National Stage Application of International Patent Application No. PCT/US2020/044830, filed Aug. 4, 2020 which claims the benefit of U.S. Provisional Application No. 62/882,565, filed on Aug. 4, 2019, the entire contents of which are incorporated by reference herein.

FIELD

The present disclosure relates generally to wireless communications, and more particularly to wireless communications systems, devices, methods, and computer readable product that provide practical solutions for implementing 2-step RACH in wireless communication systems, especially 5G NR systems.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention. Moreover, it is the present inventors who recognized limitations of conventional systems for implementing 2-step RACH processes in 5G systems. For example, the present inventors recognized that although LTE RACH is already employed, the implementation of 4-step RACH and 2-step RACH is developing for 5G NR and a number of implementation issues remain to be resolved.

SUMMARY

An exemplary embodiment of the present disclosure provides a first apparatus in a wireless communication system. The first apparatus includes circuitry configured to trigger a Random Access Channel (RACH) procedure; select a two-step RACH procedure from among a plurality of RACH procedures as a RACH type to be performed; select a MsgA transmission resource; transmit a MsgA; and monitor for a network response from a second apparatus.

An exemplary embodiment of the present disclosure provides a method performed by first apparatus in a wireless communication system. The method includes: triggering a Random Access Channel (RACH) procedure; selecting a two-step RACH procedure from among a plurality of RACH procedures as a RACH type to be performed; selecting a MsgA transmission resource; transmitting a MsgA; and monitoring for a network response from a second apparatus.

An exemplary embodiment of the present disclosure provides a second apparatus in a wireless communication system. The second apparatus includes circuitry configured to receive a MsgA from a first apparatus; send a network response to the first apparatus, wherein the first apparatus triggers a Random Access Channel (RACH) procedure, selects a two-step RACH procedure from among a plurality of RACH procedures as a RACH type to be performed, and selects a MsgA transmission resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
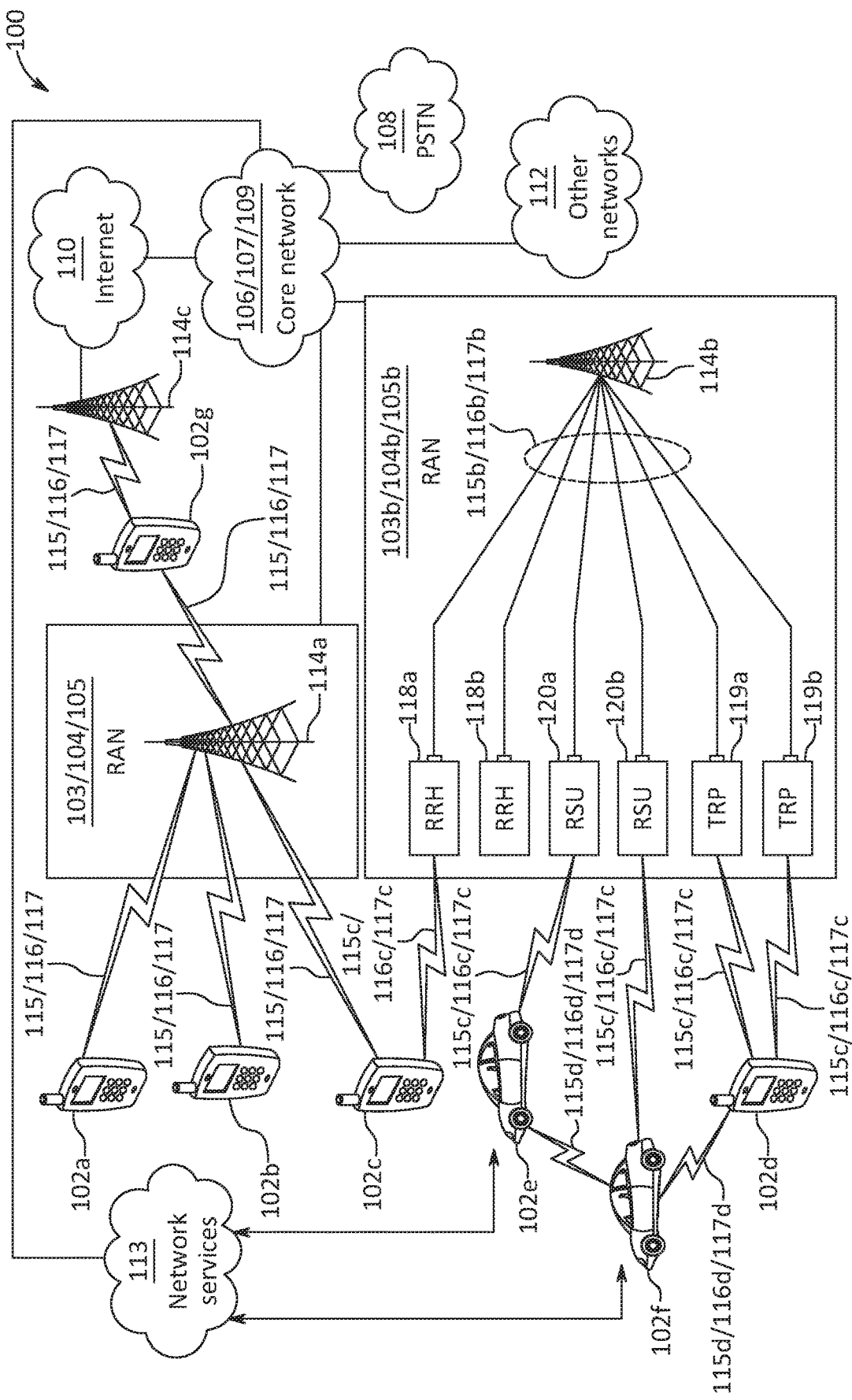
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB), ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

| Abbreviations and Definitions | |
|---|---|
| BFR | Beam Failure Recovery |
| CB | Contention Based |
| CF | Contention Free |
| CAPC | Channel Access Priority Class |
| CBRA | Contention Based Random Access |
| CCCH | Common Control Channel |
| CDM | Code Division Multiplexing |
| CFRA | Contention Free Random Access |
| COT | Channel Occupancy Time |
| CP | Control Plane |
| CRC | Cyclic Redundancy Check |
| CSI | Channel State Information |
| C-RNTI | Cell RNTI |
| DCI | Downlink Control Information |
| DFT | Discrete Fourier Transform |
| DL | Downlink |
| DMRS | Demodulation Reference Signals |
| EDT | Early Data Transmission |
| FD | Frequency Division |
| FDD | Frequency Division Multiplexing |
| FR | Frequency Range |
| gNB | NR NodeB |
| GPS | Global Positioning System |
| LAA | Licensed-Assisted Access |
| LCG | Logical Channel Group |
| LCH | Logical Channel |
| LBT | Listen-Before-Talk |
| MAC | Media Access Control |
| MAC CE | MAC Control Element |
| MCS | Modulation and Coding Scheme |
| NR | New Radio |
| $N_{TA}$ | Timing advance between downlink and uplink |
| NTN | Non-Terrestrial Network |
| NUL | Normal Uplink |
| OCC | Orthogonal Cover Code |
| PAPR | Peak-to-Average Power Ratio |
| PCell | Primary Cell |
| PDCCH | Physical Downlink Control Channel |
| PDSCH | Physical Downlink Shared Channel |
| PDU | Protocol Data Unit |
| PO | PUSCH Occasion |
| PRACH | Physical Random Access Channel |
| PRU | PUSCH Resource Unit |
| PUCCH | Physical Uplink Control Channel |
| PUSCH | Physical Uplink Shared Channel |
| QCL | Quasi Co-Located |
| QoS | Quality-of-Service |
| RA | Random Access |
| RACH | Random Access Channel |
| RAR | Random Access Response |
| RB | Resource Block |
| RNTI | Radio Network Temporary Identifier |
| RO | RACH Occasion |
| RRC | Radio Resource Control |
| RS | Reference Signal |
| RSRP | Reference Signal Received Power |
| RSRQ | Reference Signal Received Quality |
| RSSI | Received Signal Strength Indicator |
| RSU | Roadside Unit |
| RTT | Round Trip Time |
| SCell | Secondary Cell |
| SI | System Information |
| SIB | System Information Block |
| SINR | Signal-to-Interference and Noise Ratio |
| SpCell | Special Cell |
| SR | Scheduling Request |
| SSB | Synchronization Signal Block |
| SUL | Supplementary Uplink |
| $T_c$ | Basic time unit for NR |
| TA | Timing Advance |
| TB | Transport Block |
| TBS | Transmit Block Size |
| TCI | Transmission Configuration Indicator |

-continued

| Abbreviations and Definitions | |
|---|---|
| TC-RNTI | Temporary C-RNTI |
| TD | Time Division |
| TN | Terrestrial Network |
| TDM | Time Division Multiplexing |
| TRP | Transmission Receive Point |
| UAV | Unmanned Aerial Vehicle |
| UCI | Uplink Control Information |
| UE | User Equipment |
| UL | Uplink |
| UP | User Plane |

Example Communication System and Networks

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113.

RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
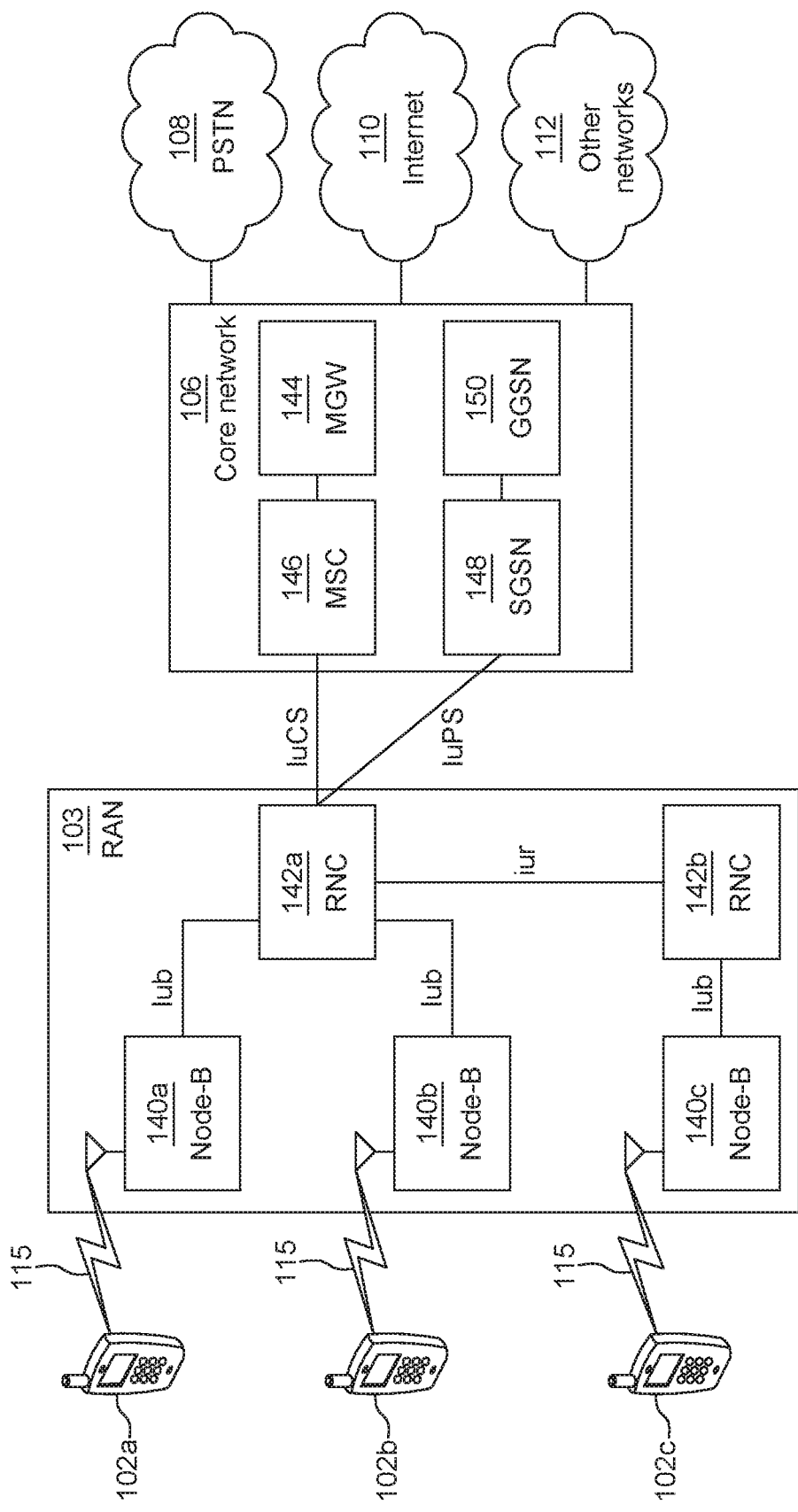
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
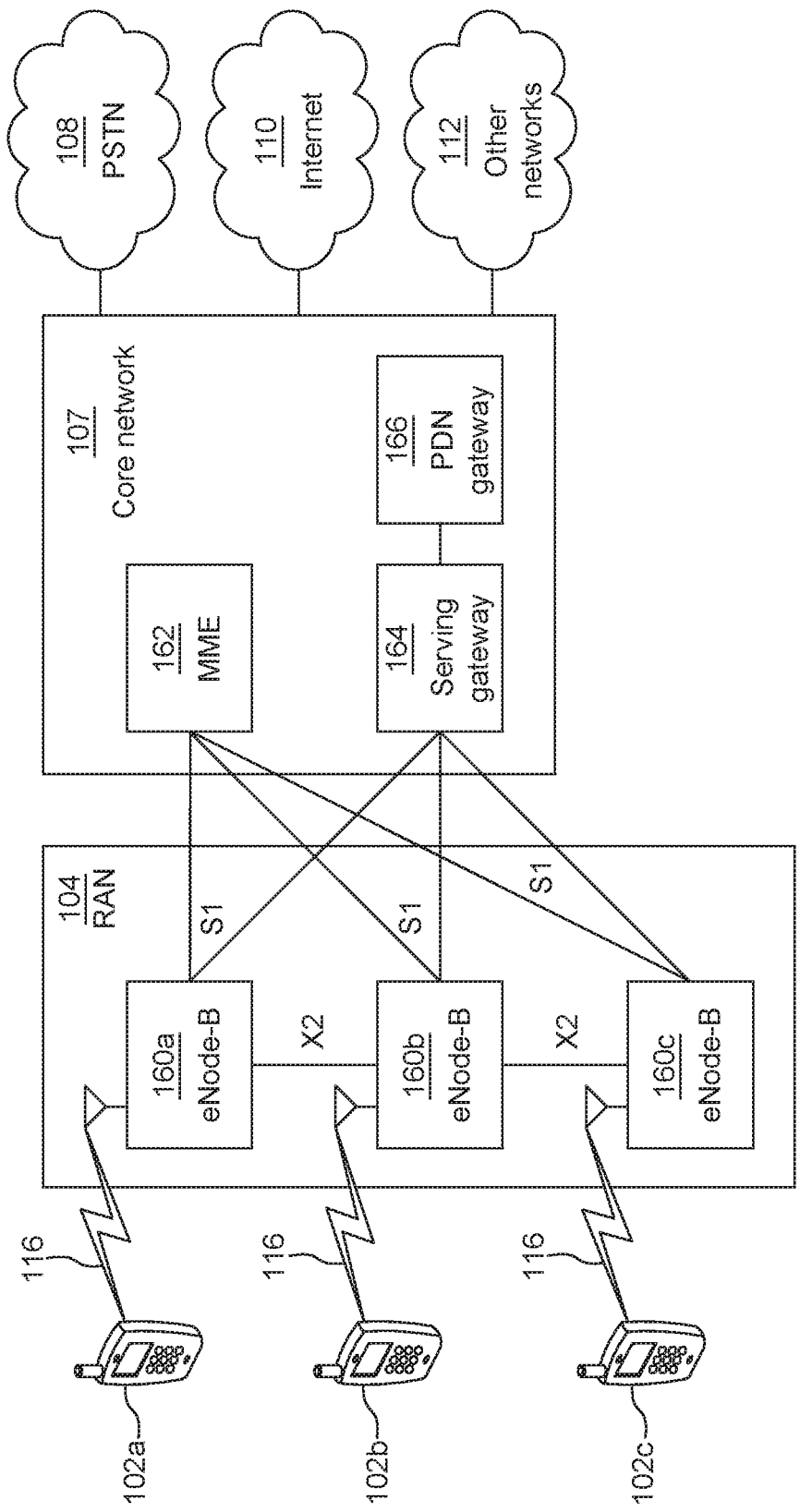
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
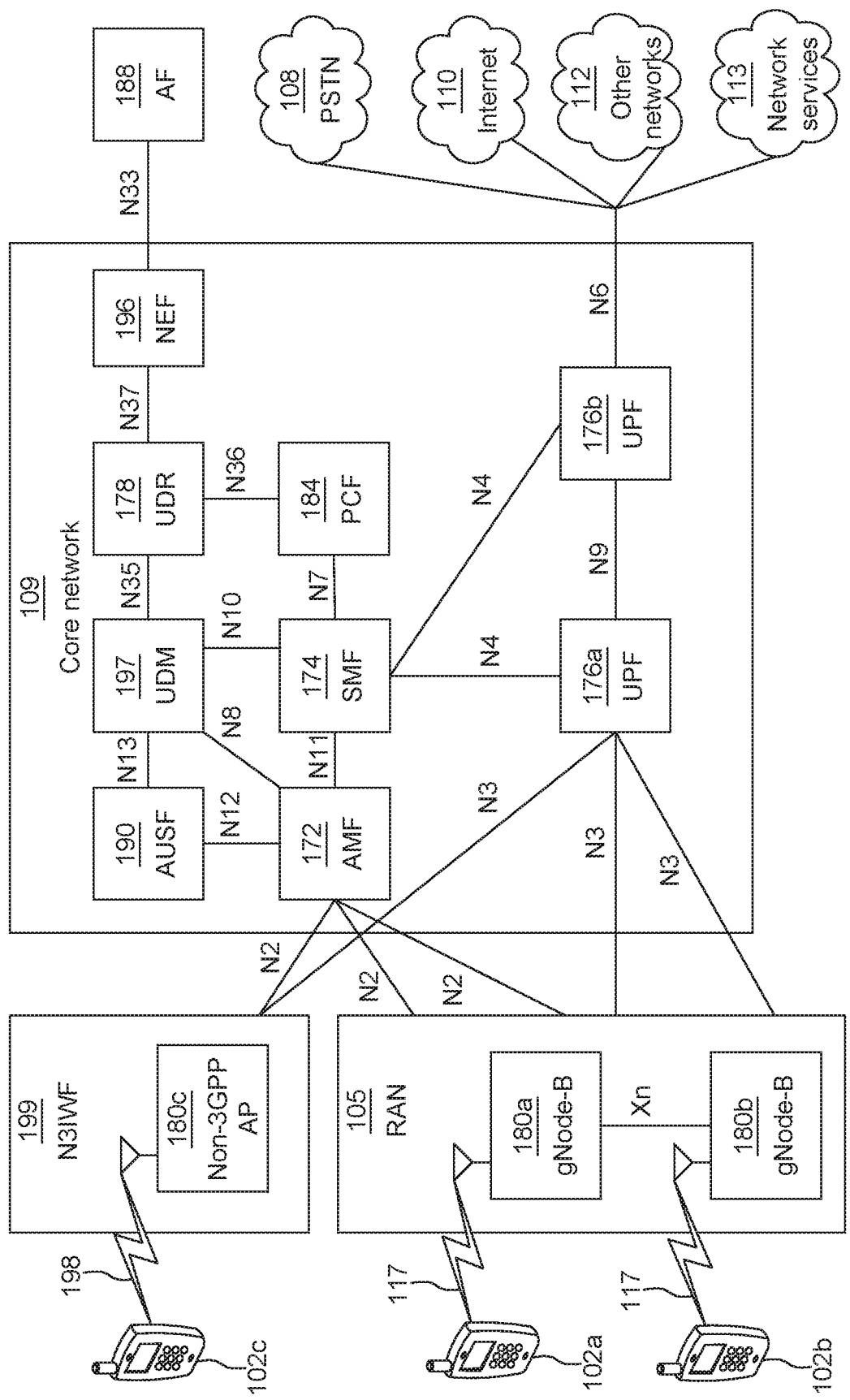
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
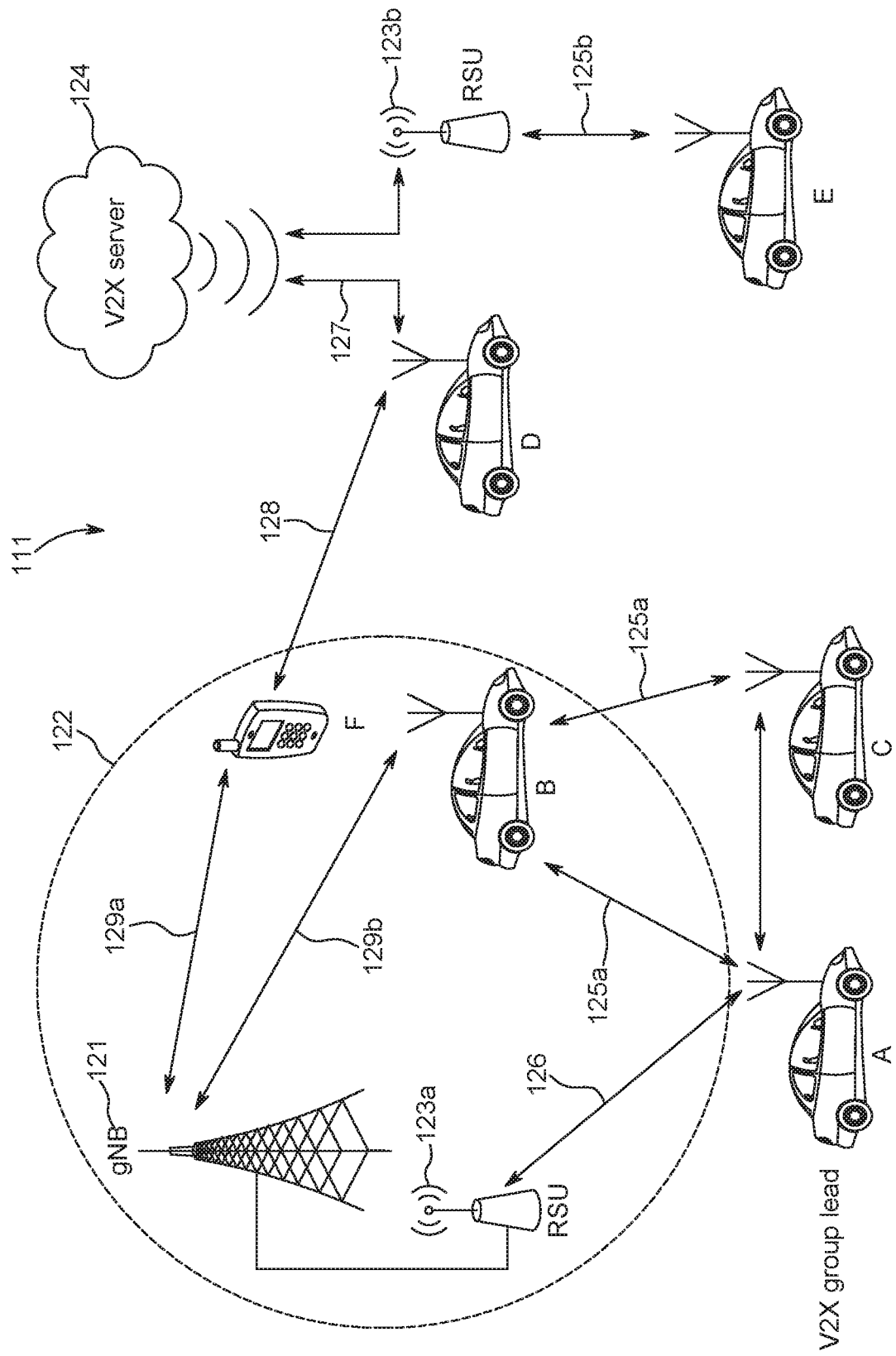
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 a,125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
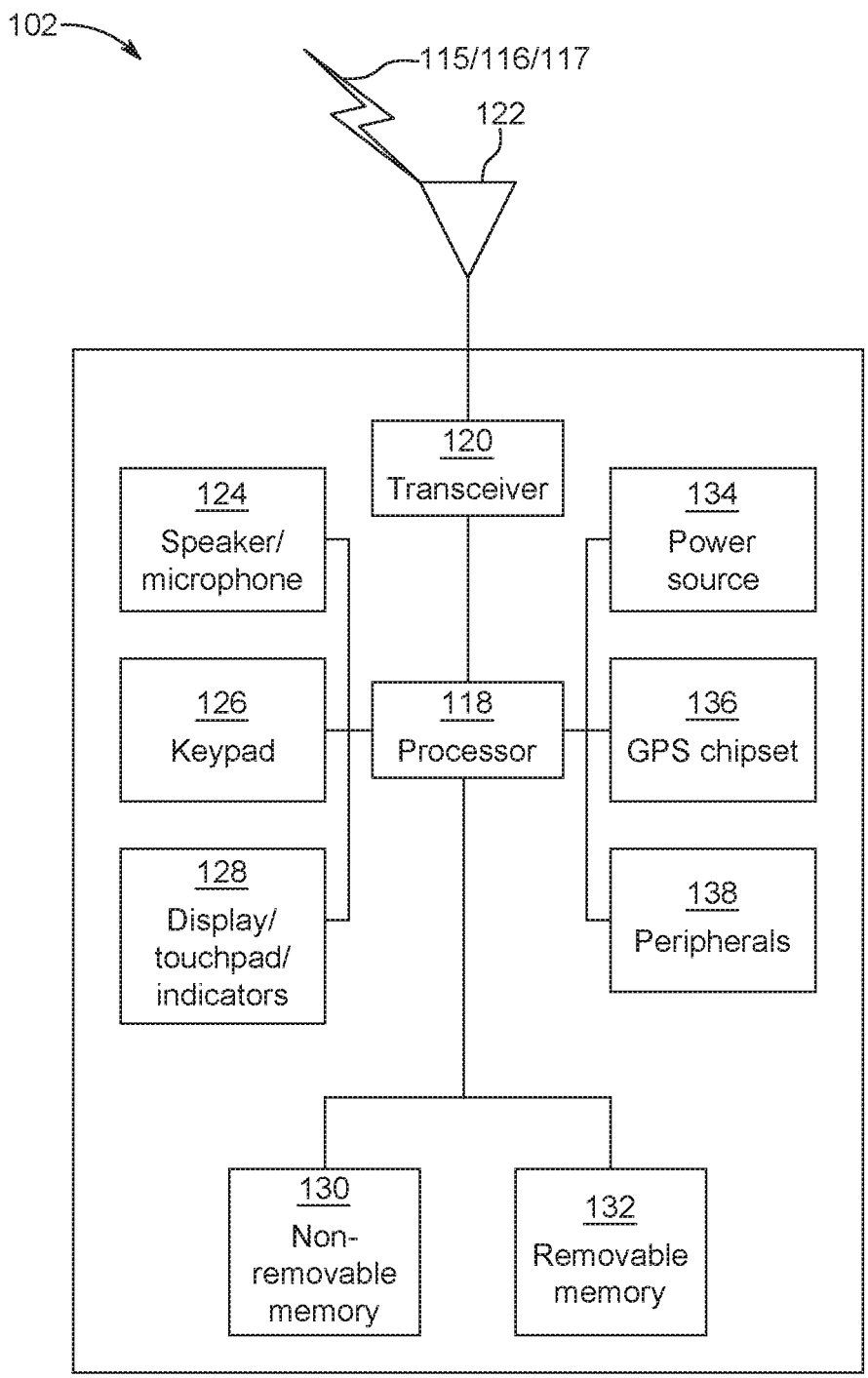
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
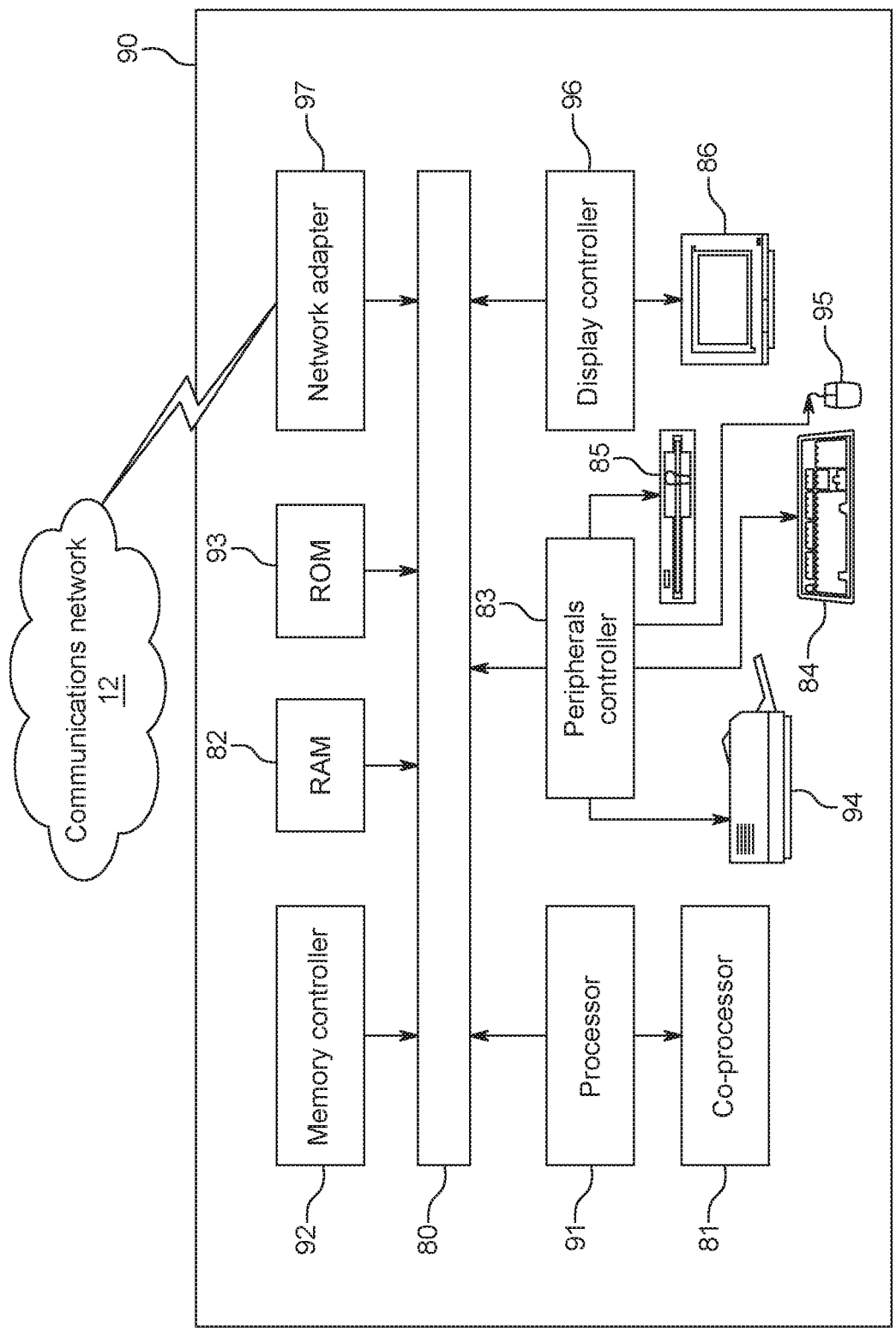
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Random Access Procedure

A high level description of the NR random access procedure is defined in 3GPP TS 38.300 [1].

LTE Licensed Assisted Access

A high level description of LTE Licensed Assisted Access is provided in 3GPP TS 36.300 [2].

Channel Access Categories

The channel access schemes evaluated for LAA are defined in 3GPP TR 36.889 [3].

UL Channel Access Procedures

LAA Type 1 and Type 2 UL channel access procedures are defined in 3GPP TS 36.213 [4].

Beam Failure Detection and Recovery

NR beam failure detection and recovery is defined in 3GPP TS 38.300 [1].

Issues Addressed by the Present Disclosure

First Issue: Efficient Transmission of MAC PDUs with Various Sizes and QoS Requirements Using 2-Step RACH The triggers defined for NR 4-step RACH are also applicable for 2-step RACH. Furthermore, Early Data Transmission (EDT), which allows one uplink data transmission optionally followed by one downlink data transmission during the Random Access procedure, is already supported for LTE [2], and is likely to be considered as a use case for 2-step RACH in NR. MsgA corresponds to the preamble and payload transmissions of the random access procedure when 2-step RACH is selected as the RACH type. [1] The requirements on the MsgA payload (e.g. size, latency, reliability) will depend on the triggering event; e.g. Control Plane (CP) signaling, User Plane (UP) data transmission. Therefore, there is a need for a mechanism to support efficient transmission of MAC PDUs with various sizes via MsgA and MsgB; and to ensure the QoS requirements (e.g. latency, reliability) of the messages signaled via the 2-step RACH procedure are met. Furthermore, since it is expected that a network supporting 2-step RACH will also support 4-step RACH, a mechanism to select the RACH type that ensures the load is balanced between 2-step RACH and 4-step RACH is also needed Second Issue: MsgA PUSCH Reception for Unsynchronized UEs Typically, in cellular systems, a UE initially acquires UL synchronization through random access procedure during which the base station signals to the UE as part of the random access response message an initial timing advance value as an absolute time advance value of the start of the uplink frame relative to the start of the corresponding downlink frame. The UE then continues to maintain uplink synchronization with the base station through periodic UL transmission controlled by a timing advance timer, which allows the base station to determine if adjustment to the time advance is needed; and if needed, the base station updates into the UE, the timing advance value by signaling to the UE a time advance value relative to the current timing advance value in the UE.

When performing 2-step RACH, the UE may not have UL synchronization. For Non-Terrestrial Networks (NTN)s and Terrestrial networks (TNs) with large cells, the MsgA PUSCH reception for a given UE may fail if the timing error exceeds the CP length. Furthermore, the MsgA transmissions from multiple UEs will not be orthogonal if they are not properly time aligned when received by the gNB, which will cause interference between the MsgA PUSCH transmissions of neighboring UEs. Therefore, to ensure MsgA PUSCH transmission can be received reliably in NTNs and TNs with large cells, there is a need for a mechanism to improve the time-alignment for unsynchronized UEs when performing a 2-step RACH procedure.

Third Issue: BFR Latency and Radio Resource Efficiency

NR Release 15 supports CF BFR and CB BFR. CF BFR requires a UE to be configured with dedicated RACH resources for each candidate beam that may be selected by a UE when performing BFR. The gNB can implicitly identify the UE performing BFR and the selected beam based on the detected random access preamble. The CF BFR procedure is optimal from a signaling and latency perspective, since the BFR procedure can be completed in two steps. However, it can be very inefficient from a radio resource perspective, since it requires dedicated RACH resources for each candidate beam that may be selected by a UE when performing BFR. CB BFR does not require dedicated RACH resources to be configured, but instead uses a 4-step RACH procedure to indicate the UE identity and selected beam to the gNB when performing BFR. The benefit of not requiring dedicated RACH resources comes at the cost of increased signaling and latency, since 4 steps are needed to complete the BFR procedure.

If the number of candidate beams is very large, which is likely to be the case for deployments in FR2 and FR4 bands which are expected to have a higher rate of beam failure occurrences when compared to deployments in FR1 bands, using CF BFR may be impractical. However, the increased signaling and latency associated with CB BFR may not be tolerable. Therefore, there is a need for a mechanism to perform BFR that is more efficient from a radio resource perspective, while at the same time does not introduce additional signaling and latency.

TABLE 1

Definition of Frequency Ranges

| Frequency Range Designation | Corresponding Frequency Range |
| --- | --- |
| FR1 | 410 MHz-7125 MHz |
| FR2 | 24250 MHz-52600 MHz |
| FR4 | 52600 MHz-114250 MHz |

Fourth Issue: Large Variation in RTT for NTNs

For Non-Terrestrial Networks (NTNs), the Round-trip-Time (RTT) can vary significantly for UEs at the cell edge versus the cell center. This variation can result in an ambiguity in the MsgA preamble reception at the gNB if the preamble reception windows for the RACH Occasions (RO) overlap. If the gNB cannot determine which RO was used to transmit the preamble, the timing advance command will not be calculated correctly, which will result in interference in subsequent UL transmissions. The ROs can be configured such that the preamble reception windows do not overlap. However, this will reduce the RACH capacity. Furthermore, if the RTT is not taken into consideration when determining the start of the ra-Response-Window, then the usable portion of the ra-Response-Window will be decreased, which can cause congestion when scheduling the MsgBs/RARs. Failing to take the RTT into consideration when determining the start of the ra-Response-Window will also result in unnecessary power consumption by the UE 102, since it will be monitoring for MsgBs/RARs before they can be transmitted by the gNB 180b. Therefore, to increase the RACH capacity and minimize unnecessary UE power consumption for NTNs, there is a need for a mechanism to account for the RTT when performing a 2-step RACH procedure.

Fifth Issue: Impact of LBT Failures on 2-Step RACH for NR-U

To alleviate the impacts of LBT failures, a 2-step RACH procedure may be used for NR-U since it reduces the number of LBT attempts by half compared to the 4-step RACH procedure. However, to achieve 2-step RACH performance that is comparable to licensed band, additional enhancements will be required to reduce the LBT impact even further. During the NR-U SI [3], it was agreed that in order to alleviate the impact of LBT failures, additional opportunities for the RACH messages may be introduced, e.g. in time or frequency domain. COT sharing has also been discussed as a mechanism to reduce the impact of LBT failures. The NR 2-step RACH procedure, which is being developed for licensed band operation, does not include support for mechanisms to reduce the impact of LBT failures (e.g. additional opportunities for MsgA transmission, COT sharing). Therefore, there is a need to enhance the 2-step RACH procedure to provide support for new mechanisms that reduce the impact of LBT failures when performing a 2-step RACH for NR-U.

Furthermore, for some configurations, separate LBT procedures may be required for the MsgA preamble and PUSCH; e.g. when the MsgA preamble and PUSCH are TDM-ed or the MsgA preamble and PUSCH are FDM-ed in different sub-bands. For such configurations, there is a need for a mechanism to determine when the UE needs to perform two LBT procedures, how the Channel Access Priority Class (CAPC) for the LBT procedures are determined and the behavior for scenarios where one or both of the LBT procedures fail.

Overview

As a non-limiting summary of the contents of the present disclosure, at least the following solutions are set forth.

Solutions for efficient transmission of MAC PDUs with various sizes and QoS requirements using 2-step RACH Methods to perform RACH type selection based on network configuration, DL radio quality, MsgA payload size, logical channel and the status of the timeAlignmentTimer. Throughout the disclosure, DL radio quality and DL signal quality are interchangeable.

Methods to perform MsgA resource selection for one-to-one, many-to-one and one-to-many mappings between preambles and PUSCH Resource Units Methods to perform MsgA preamble and PUSCH transmissions Methods to perform MsgB/Msg2 Reception Solutions for MsgA PUSCH reception for unsynchronized UEs Methods for distance based open-loop timing advance value calculation Methods for determination of timing advance based on a proximity UE timing Methods for determination of timing advance based on assistance information from gNB Solutions for BFR latency and radio resource efficiency Methods to perform BFR using 2-step RACH Methods to perform BFR for an Scell using 2-step RACH Solutions for impact of LBT failures on 2-step RACH for NR-U Methods to perform channel access procedures for MsgA configurations with TDM-ed preamble and PUSCH Methods to prevent inter-MsgA blocking Methods to transmit MsgA preamble and PUSCH on different beams Detailed Descriptions of the Solutions In the following subsections, solutions are defined to address the above-identified issues to be addressed. The solutions may be used on their own or in combination with one or more of the solutions described herein. In the solution descriptions, the term LBT is used to make reference to UL channel access procedures that are the same as or similar to the Type 1 and Type 2 UL channel access procedures used for LTE LAA.

Exemplary Embodiments for Efficient Transmission of MAC PDUs with Various Sizes and QoS Requirements Using 2-Step RACH In the following subsections, procedures are described to perform 2-step RACH that may be used to address the problems associated with efficient transmission of MAC PDUs with various sizes and QoS requirements using 2-Step RACH as described above in the first issue to be addressed.

RACH Type Selection

A network may support 2-step and 4-step RACH procedures. For such scenarios, a UE may perform RACH type selection prior to commencing with a Random Access procedure. In the following subsections, procedures are defined for performing RACH type selection. In addition to selecting between 2-step RACH and 4-step RACH, the UE 102 may also consider selection of a prioritized 2-step RACH procedure. The procedures described herein may be extended to include selection of a prioritized 2-step RACH procedure.

RACH Type Selection Based on Network Configuration

The RACH type selection may be based on network configuration, where the configuration is provided to the UE 102 via broadcast or dedicated signaling. For example, the network may configure the UE 102 to use 2-step RACH for specific triggering events; e.g. initial access from RRC_IDLE, transition from RRC_INACTIVE.

To implement this behavior, the RACH Type selection procedure could be defined as follows:

1> if the Serving Cell for the Random Access Procedure is configured for 2-step RACH; and
1> if the Random Access Procedure was initiated for initial access from RRC_IDLE or transition from RRC_INACTIVE;
   2> select 2-step RACH as the RACH type for performing the Random Access procedure.
1> else:
   2> select 4-step RACH as the RACH type for performing the Random Access procedure.

For NR, a UE 102 may be configured to perform a prioritized random access procedure for specific triggers; e.g. handover and BFR. When performing a prioritized random access procedure, different values are used for some of the RACH parameters as configured by the network; e.g. powerRampingStepHighPriority, scalingFactorBI. The parameter powerRampingStepHighPriority corresponds to the power-ramping factor used in the case of prioritized Random Access procedure, which controls by how much the power is "stepped" up for a retransmission following an unsuccessful RACH attempt. The parameter scalingFactorBI corresponds to a scaling factor used in the case of prioritized Random Access procedure, that is used to scale the value of the Backoff Indicator signaled via a Random Access Response.

Prioritization of the random access procedure may also be accomplished by performing 2-step RACH. Network configuration may be used to configure a UE to perform a 2-step RACH procedure in this case. The set of prioritized RACH parameters; powerRampingStepHighPriority, scalingFactorBI, used when performing prioritized 2-step RACH may be the same as the set of parameters used when performing a prioritized 4-step RACH procedure or a separate set of prioritized 2-step RACH parameters may be configured. And in another exemplary embodiment, the default parameters broadcast by the cell for the 4-step RACH may also be used.

RACH Type Selection Based on DL Radio Quality

The RACH type selection may be based on the DL radio quality; e.g. SS-RSRP or CSI-RSRP. The DL radio quality is compared with a threshold to determine the RACH type, where the threshold may be predefined or provided by the network via broadcast or dedicated signaling. The threshold may be defined as an absolute value; e.g. 2-step-rsrp-ThresholdSSB, 2-step-rsrp-ThresholdCSI-RS. Alternatively, the threshold may be defined as a relative value, where the threshold value is relative to a threshold used for Random Access Resource selection; e.g. rsrp-ThresholdSSB, rsrp-ThresholdCSI-RS.

To implement this behavior, the RACH Type selection procedure could be defined as follows:

```
1>if the Serving Cell for the Random Access Procedure is configured for 2-step RACH;
    2> if an SSB is selected;
        3> if SS-RSRP is above rsrp-ThresholdSSB or 2-step-rsrp-ThresholdSSB:
            4> select 2-step RACH as the RACH type for performing the Random
            Access procedure.
        3> else:
            4> select 4-step RACH as the RACH type for performing the Random
            Access procedure.
    2> else if CSI-RS is selected;
        3> if CSI-RSRP is above rsrp-ThresholdCSI-RS or 2-step-rsrp-ThresholdCSI-RS :
            4> select 2-step RACH as the RACH type for performing the Random
            Access procedure.
        3> else:
            4> select 4-step RACH as the RACH type for performing the Random
            Access procedure.
```

In another exemplary embodiment, the RACH type selection may be based on pathloss, where the downlink pathloss calculation may be based on the DL RS associated with the selected SSB.

To implement this behavior, the RACH Type selection procedure could be defined as follows:

```
1>if the Serving Cell for the Random Access Procedure is configured for 2-step RACH;
    2> if the RSRP of the downlink pathloss reference is less than rsrp-ThresholdSSB-2-step-ra:
        3> select 4-step RACH as the RACH type for performing the Random Access
        procedure.
    2> else:
        3> select 2-step RACH as the RACH type for performing the Random Access
        procedure.
```

And in it yet other embodiments, the RACH type selection may be based on other measurement quantities; e.g. RSRQ, RSSI, SINR etc.

RACH Type Selection Based on MsgA PDU Size

The RACH type selection may be based on the MsgA PDU size. For example, if the MsgA PDU is below a threshold; e.g. ra-MsgASize, the 2-step RACH procedure is selected; otherwise, the 4-step RACH is selected. The threshold may be predefined or provided by the network via broadcast or dedicated signaling.

To implement this behavior, the RACH Type selection procedure could be defined as follows:

```
1>if the Serving Cell for the Random Access Procedure is configured for 2-step RACH;
    2> if the MsgA PDU size is less than ra-MsgASize:
        3> select 2-step RACH as the RACH type for performing the Random Access
        procedure.
    2> else:
        3> select 4-step RACH as the RACH type for performing the Random Access
        procedure.
```

RACH Type Selection Based on Logical Channel

The RACH type selection may be based on the logical channel that triggered the Random Access procedure. The mapping between logical channel and RACH type may be predefined or provided by the network via broadcast or dedicated signaling. The logical channel that triggered the Random Access procedure may correspond to the logical channel associated with the BSR that triggered the SR, that in turn triggered the RACH procedure.

In an exemplary embodiment, 2-step RACH is selected for the CCCH or CCCH1 logical channel, thereby allowing RRC messages used for (re-)establishing a connection to be signaled via MsgA.

To implement this behavior, the RACH Type selection procedure could be defined as follows:

1> if the Serving Cell for the Random Access Procedure is configured for 2-step RACH;
   2> if the Random Access procedure was initiated for the CCCH or CCCH1 logical channel:
      3> select 2-step RACH as the RACH type for performing the Random Access procedure.
   2> else:
      3> select 4-step RACH as the RACH type for performing the Random Access procedure.

In an exemplary embodiment, the RACH type selection is based on one or more QoS characteristic parameters for e.g. priority of the logical channel that triggered the Random Access procedure. The priority of the logical channel that triggered the Random Access procedure is compared with a threshold to determine the RACH type.

To implement this behavior, the RACH Type selection procedure could be defined as follows:

1> if the Serving Cell for the Random Access Procedure is configured for 2-step RACH;
   2> if the priority of the logical channel that triggered Random Access procedures is less than 2-step-priority:
      3> select 2-step RACH as the RACH type for performing the Random Access procedure.
   2> else:
      3> select 4-step RACH as the RACH type for performing the Random Access procedure.

Note:
In this example, an increasing priority value is assumed to indicate a lower priority level.

In an exemplary embodiment, the RACH type may be explicitly configured for a logical channel. In this embodiment, the RACH type for performing the Random Access procedure would be set to the RACH type configured for the logical channel that triggered the Random Access procedure.

To implement this behavior, the RACH Type selection procedure could be defined as follows:
1> set the RACH type to the RACH type configured for the logical channel that triggered the Random Access procedure.

RACH Type Selection Based on timeAlignmentTimer

The RACH type selection may be based on whether the timeAlignmentTimer is running.

When the timeAlignmentTimer is running, the UL is assumed to be "in sync," thereby allowing MsgA PUSCH transmissions to occur without creating UL interference.

To implement this behavior, the RACH Type selection procedure could be defined as follows:

1> if the Serving Cell for the Random Access Procedure is configured for 2-step RACH;
   2> if the timeAlignmentTimer associated with the Serving Cell for which the Random Access Procedure has been triggered is running:
      3> select 2-step RACH as the RACH type for performing the Random Access procedure.
   2> else:
      3> select 4-step RACH as the RACH type for performing the Random Access procedure.

For scenarios where the timeAlignmentTimer is not running, the RACH type selection may also be based on whether or not an open loop Timing Advance Command can be applied, where the open loop Timing Advance Command may be calculated using the methods described herein.

RACH Type Selection Based on UE Position

The RACH type selection may be based on, for example, the measured received time difference between two or more reference signals at the UE 102 or between a serving cell and one or more neighbor cells at the UE 102, e.g. the received frame time difference between the cells. For example, the UE 102 may select 2-step RACH if a time difference is above a configurable threshold and 4-step RACH if a time difference is below the threshold. In some cases, multiple thresholds are configured, and the UE 102 may select 2-step RACH if a time difference is above one threshold but below another threshold.

In some cases, a reference point in the time difference measurement is the path received first in time.

The time difference between signals/cells may, for example, be correlated with the distance to the corresponding transmitting Transmission Receive Points (TRPs). Consider, the example that signals are transmitted synchronously from two TRPs. If a UE 102 is in the middle between the TRPs, the signals may be received with a small time difference. If the UE 102 is close to one TRP but far away from the other TRP, the signals are received with a larger time difference. Hence, UEs 102 with similar received time difference may be received time aligned at a TRP.

RACH Type Selection for Retransmissions

When performing a 2-step RACH or 4-step RACH procedure, for scenarios where the UE 102 does not receive a response from the network (e.g. MsgB or RAR), the UE 102 may use the RACH type selected prior to commencing with the Random Access procedure for a retransmission. Alternatively, the UE 102 may perform RACH type selection prior to performing a retransmission.

In an exemplary embodiment, a timer or retransmission counter may be used to determine when the UE 102 should select a different RACH type; e.g. fallback from 2-step RACH to 4-step RACH.

When the UE 102 falls back to 4-step RACH, if a prioritized 2-step RACH procedure was being performed, then a prioritized 4-step RACH prioritized may also performed. In an exemplary embodiment, the same prioritized parameters are used for 2-step and 4-step RACH; e.g. powerRampingStepHighPriority, scalingFactorBI. Alternatively, separate sets of prioritized RACH parameters may be configured for 2-step RACH and 4-step RACH. In an exemplary embodiment, when a UE 102 falls back to 4-step RACH, a prioritized 4-step RACH procedure may be performed regardless of the priority of the 2-step RACH procedure. In an exemplary embodiment, when a UE 102 falls back to 4-step RACH, a regular 4-step RACH procedure may be performed regardless of the priority of the 2-step RACH procedure.

RACH Type Selection Based on UL Carrier

In an exemplary embodiment, the RACH type selection may be based on the UL carrier. For example, the RACH type may be configured per carrier; e.g. 4-step RACH is used for the SUL and 2-step RACH is used for the NUL. This configuration would allow the Msg1 and MsgA transmission to be separated onto different carriers. If the selection of UL carrier is based on a measurement, e.g. an SSB RSRP, the selection of UL carrier, or equivalently between 2-step or 4-step RACH procedure, may be based on a configurable threshold, e.g. rsrp-ThresholdSSB-SUL.

RACH Type Selection Based on Preamble Group

For 4-step RACH, there are two preambles groups (group A and B), from which the UE selects a preamble, based on Msg3 size. If 2-step RACH is configured, groupA preambles could be assigned to 2-step RACH and groupB preambles would be assigned to 4-step RACH.

RACH Type Selection Based on Power/Battery Status

The power/battery status of the UE 102 may be considered for RACH type selection. For example, for scenarios where 2-step RACH may consume less power than 4-step RACH, if a UE 102 is in low power mode, it will use select 2-step RACH for power saving purposes. In an exemplary embodiment, to reduce the latency and/or number of retransmissions associated with completing the RACH proceed, the UE 102 may select a prioritized 2-step RACH procedure to reduce power consumption.

RACH Type Selection Based on Network Indication

The network may provide an indication to the UE 102 to indicate the type of RACH procedure to perform, where the indication may be provided physical layer or higher layer signaling. In one example, a DCI field in a PDCCH order may be used to indicate the RACH type to be used.

In an exemplary embodiment, the handover command signaled via the RRC layer may include field to indicate the RACH type to use when performing the RACH procedure with the target cell.

The network indication may also include information to configure the UE 102 to perform a prioritized 2-step RACH procedure. For example, the RACH-ConfigDedicated IE included in the handover command may include a field to indicate if 2-step RACH is performed and may also include ra-Prioritization parameters used to specify the powerRampingStepHighPriority and scalingFactorBI RACH parameters.

MsgA Resource Selection

MsgA is comprised of a Random Access preamble and a PUSCH transmission. Therefore, selection of the MsgA resource includes selection of a PRACH resource; i.e. preamble and RACH Occasion (RO), and a PUSCH Resource Unit (PRU). A RO and an associated PRU may be multiplexed using TDM or FDM. The PRUs may also be TDM-ed and/or FDM-ed with each other. A one-to-one, many-to-one and one-to-many mapping can be envisaged for the mapping between Random Access preambles in each RO and the associated PRUs. In the following subsections, MsgA Resource Selection procedures are described that may be used when performing 2-step RACH.

One-to-One Mapping between Preambles and PUSCH Resource Units

Figure 2:
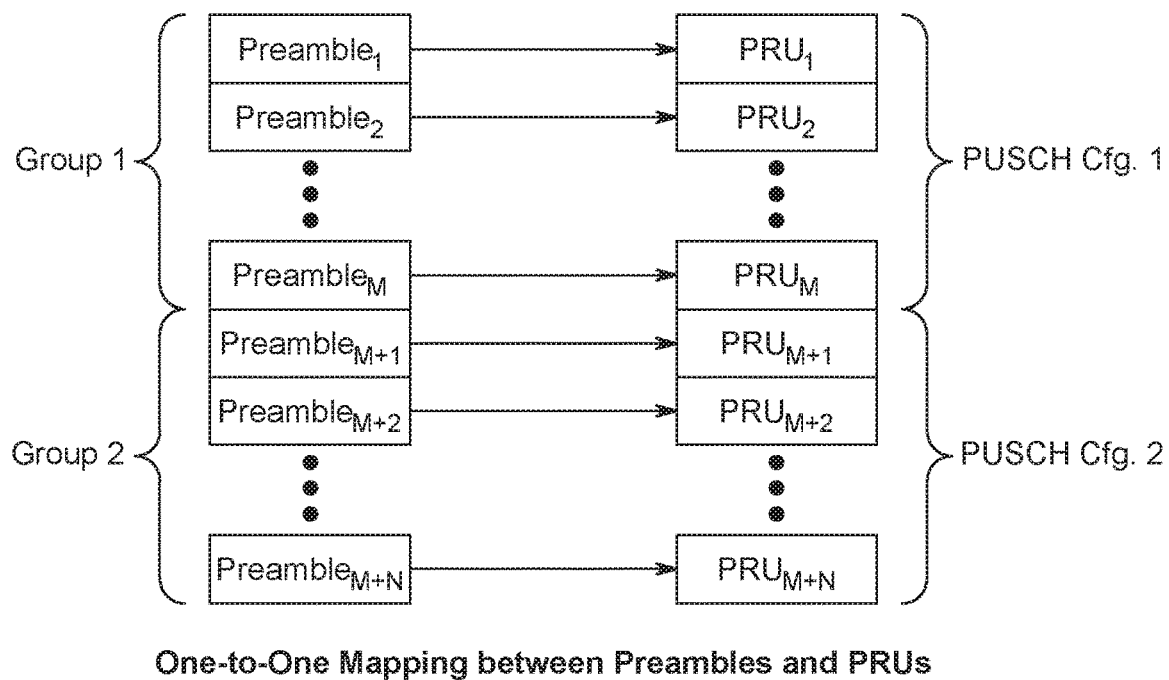
FIG. 2 is a diagram that shows One-to-One Mapping between Preambles and PRUs in accordance with an exemplary embodiment.

For a one-to-one mapping, each Random Access preamble in a RO is associated with a PRU. The preamble space may be partitioned into one or more groups, where each group corresponds to a different PUSCH configuration. For example, one or more parameters such as MCS, TBS size, number of PRBs per PRU or number of symbols per PRU, DMRS, etc. may be defined differently for each PUSCH configuration. FIG. 2 is an illustration of an exemplary one-to-one mapping between Random Access Preambles and PRUs for a configuration where two preamble groups; e.g. Group 1 and Group 2, are configured. In this example, Group 1 is comprised of M preambles and group 2 is comprised of N preambles. When a Random Access procedure is initiated, the UE 102 may select the preamble group based on one or more of the following: MsgA PDU size, DL signal quality, pathloss, Random Access triggering event, etc. In an exemplary embodiment, multiple preamble groups associated with PUSCH configurations that correspond to different TBS sizes are defined. Threshold parameters may be used by the UE 102 to select the appropriate preamble group based on the MsgA PDU size.

To illustrate this example, consider the configuration where two preamble groups; e.g. Group 1 and Group 2, are configured as shown in FIG. 2. To facilitate MsgA Resource Selection, higher layers; e.g. RRC, may configure an IE; e.g. msgAGroup2Configured, that is comprised of a threshold to determine the group of Random Access Preambles; e.g. ra-MsgASizeGroup1, and the number of Random Access Preambles in Random Access Preamble group 1 for each SSB; e.g. numberOfRA-PreamblesMsgAGroup1.

MsgA Resource Selection based on MsgA PDU size may be performed as follows:

```
1>if at least one of the SSBs with SS-RSRP above rsrp-ThresholdSSB is available:
    2> select an SSB with SS-RSRP above rsrp-ThresholdSSB.
1>else:
    2> select any SSB.
1>If MsgA has not yet been transmitted:
    2> if Random Access Preambles MsgA group 2 is configured:
        3> if the MsgA size is greater than ra-MsgASizeGroup1:
            4> select the Random Access Preambles MsgA group 2.
```

```
    3> else:
        4> select the Random Access Preambles MsgA group 1.
    2> else:
        3> select the Random Access Preambles MsgA group 1.
1>else (i.e. MsgA is being retransmitted):
    2> select the same MsgA group of Random Access Preambles as was used for the
Random Access Preamble transmission attempt corresponding to the first transmission of MsgA.
1>select a Random Access Preamble randomly with equal probability from the Random Access
Preambles associated with the selected SSB and the selected Random Access Preambles MsgA
group.
1>set the PREAMBLE_INDEX to the selected Random Access Preamble.
1>determine the next available PRACH occasion from the PRACH occasions corresponding to
the selected SSB permitted by the restrictions given by the ra-ssb-OccasionMaskIndex if
configured or indicated by PDCCH (the MAC entity shall select a PRACH occasion randomly
with equal probability amongst the consecutive PRACH occasions according to subclause 8.1 of
TS 38.213, corresponding to the selected SSB; the MAC entity may take into account the
possible occurrence of measurement gaps when determining the next available PRACH occasion
corresponding to the selected SSB).
1>determine the next available PUSCH occasion from PUSCH occasions corresponding the
selected PRACH occasion and the selected Random Access Preamble.
1>perform the MsgA transmission procedure as described herein.
```

In the above example, the UE 102 selects the same MsgA group of Random Access Preambles as was used for the Random Access Preamble transmission attempt corresponding to the first transmission of MsgA. Alternatively, the UE 102 may perform MsgA Resource Selection for each retransmission of MsgA. In the above example, the UE 102 selects an SSB with SS-RSRP above a threshold; e.g. rsrp-ThresholdSSB. In another example, the UE 102 may select a CSI-RS with CSI-RSRP above a threshold; e.g. RSRP-ThresholdCSI-RS or msgA-RSRP-ThresholdCSI-RS.

In another example, multiple preamble groups associated with different PUSCH configurations are defined, and threshold parameters are used by the UE 102 to select the appropriate preamble group based on the DL signal quality. The PUSCH configurations associated with the different preamble groups may be defined such that they provide minimum BLER for different regions of the cell; e.g. a different MCS may be used for the PUSCH configuration associated with each preamble group.

Figure 3:
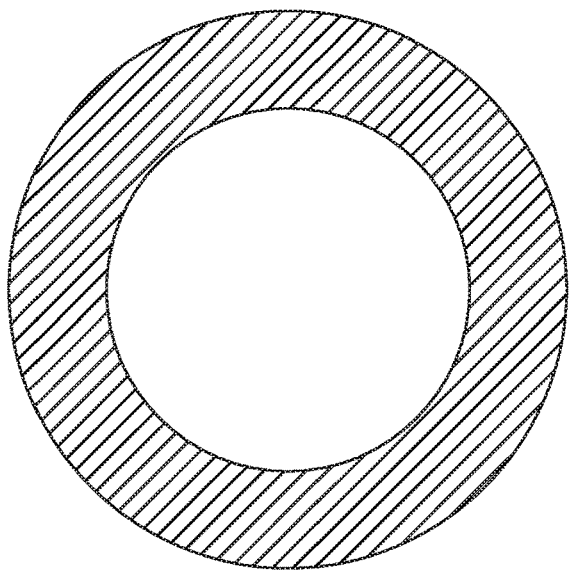
FIG. 3. is a diagram that shows Cell Partitioning Based on DL Signal Quality in accordance with an exemplary embodiment.
Figure 3:
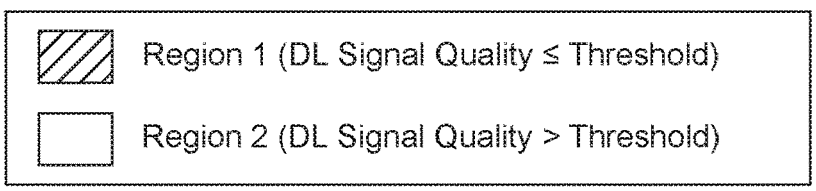

To illustrate this example, consider the scenario where the cell is divided into 2 regions corresponding to UEs 102 near the cell edge and UEs 102 near the cell center as shown in FIG. 3. Preambles in a first group; e.g. Group 1, that are associated with a first PUSCH configuration are selected by UEs in Region 1; and preambles in a second group; e.g. Group 2, that are associated with a second PUSCH configuration are selected by UEs in Region 2. Higher layers; e.g. RRC, may configure an IE; e.g. msgAGroup2Configured, that is comprised of a threshold to determine the group of Random Access Preambles; e.g. ra-MsgAThreshGroup1, and the number of Random Access Preambles in Random Access Preamble group 1 for each SSB; e.g. numberOfRAPreamblesMsgAGroup1.

MsgA Resource Selection based on DL signal quality may be performed as follows:

```
1>if at least one of the SSBs with SS-RSRP above rsrp-ThresholdSSB is available:
    2> select an SSB with SS-RSRP above rsrp-ThresholdSSB.
1>else:
    2> select any SSB.
1>If MsgA has not yet been transmitted:
    2> if Random Access Preambles MsgA group 2 is configured:
        3> if the selected SSB has an SS-RSRP above ra-MsgAThreshGroup1:
            4> select the Random Access Preambles MsgA group 2.
        3> else:
            4> select the Random Access Preambles MsgA group 1.
    2> else:
        3> select the Random Access Preambles MsgA group 1.
1>else (i.e. MsgA is being retransmitted):
    2> select the same MsgA group of Random Access Preambles as was used for the
Random Access Preamble transmission attempt corresponding to the first transmission of MsgA.
1>select a Random Access Preamble randomly with equal probability from the Random Access
Preambles associated with the selected SSB and the selected Random Access Preambles MsgA
group.
1>set the PREAMBLE_INDEX to the selected Random Access Preamble.
1>determine the next available PRACH occasion from the PRACH occasions corresponding to
the selected SSB permitted by the restrictions given by the ra-ssb-OccasionMaskIndex if
configured or indicated by PDCCH (the MAC entity shall select a PRACH occasion randomly
with equal probability amongst the consecutive PRACH occasions according to subclause 8.1 of
[5], corresponding to the selected SSB; the MAC entity may take into account the possible
occurrence of measurement gaps when determining the next available PRACH occasion
corresponding to the selected SSB).
1>determine the next available PUSCH occasion from PUSCH occasions corresponding the
selected PRACH occasion and the selected Random Access Preamble.
1>perform the MsgA transmission procedure as described herein.
```

In the above example, the UE 102 selects the same MsgA group of Random Access Preambles as was used for the Random Access Preamble transmission attempt corresponding to the first transmission of MsgA. Alternatively, the UE 102 may perform MsgA Resource Selection for each retransmission of MsgA. One can also envision a MsgA Resource Selection procedure based on measurement quantities such as RSRQ, SINR, pathloss, etc. where a similar procedure such as the one described for MsgA Resource Selection based on DL signal quality is used.

PRU. MsgA Resource Selection procedures similar to the ones described for the one-to-one mappings may be applied.

In an exemplary embodiment, a UE 102 can be provided multiple (N) SS/PBCH blocks associated with a single 2-step PRACH occasion or a SS/PBCH can be associated with multiple 2-step PRACH occasion. A number R of contention-based preambles (distinguish by preamble IDs) per 2-step PRACH occasion by higher layer parameter IE ssb-perRACH-OccasionAndCB-PreamblesPerSSB are shown as follows:

```
ssb-perRACH-OccasionAndCB-PreamblesPerSSB    CHOICE {
    oneEighth                                ENUMERATED
    {n4, n8, n12, n16, n20, n24, n28, n32, n36, n40, n44, n48, n52, n56, n60, n64},
    oneFourth                                ENUMERATED
    {n4, n8, n12, n16, n20, n24, n28, n32, n36, n40, n44, n48, n52, n56, n60, n64},
    oneHalf                                  ENUMERATED
    {n4, n8, n12, n16, n20, n24, n28, n32, n36, n40, n44, n48, n52, n56, n60, n64},
    One                                      ENUMERATED
    {n4, n8, n12, n16, n20, n24, n28, n32, n36, n40, n44, n48, n52, n56, n60, n64},
    two                                      ENUMERATED {n4, n8, n12, n16, n20, n24, n28, n32}
    four                                     INTEGER (1..16),
    eight                                    INTEGER (1..8),
    sixteen                                  INTEGER (1..4),
}
OPTIONAL, --Need M
```

In an exemplary embodiment, the MsgA resource selection may be based on the available power headroom. For example, the UE 102 may select a PRU corresponding a PUSCH configuration that allows it to perform the MsgA transmission without exceeding the available power headroom.

Many-to-One Mapping between Preambles and PUSCH Resource Units

For a many-to-one mapping, multiple Random Access preambles in a RO are associated with the same PRU. This configuration is efficient from a physical resource standpoint since it allows multiple UEs 102 to share the same PRU. To facilitate sharing of the PRU, a different DMRS port or DMRS sequence may be used for fully orthogonal DMRS for the PUSCH transmission based on the selected Random Access preamble. When performing MsgA transmission, the DMRS port or DMRS sequence may be implicitly indicated to the physical layer. Alternatively, the DMRS port or DMRS sequence may be determined by the physical layer implicitly based on the selected Random Access Preamble.

In one example, a one-to-one mapping of DMRS ports for MsgA, which include Code Division Multiplexing (CDM), Frequency Division (FD) Orthogonal Cover Codes (OCC), Time Division TD (OCC) or both FD-TD OCC, and preambles exists. This mapping can be configured via higher layers; e.g. RRC. The MsgA transmission may be performed with transform precoding; e.g. DFT precoding. The transform precoding may be configured via higher layers; e.g. RRC, where each PRU may be configured with or without transform precoding. For scenarios where precoding is off, the DMRS sequence may be based on a Zadoff-Chu sequence, which may be applicable when the number of RBs is greater than a threshold; e.g. (RB≥3); or low PAPR when transform precoding is on, which may be applicable when the number of RBs is less than a threshold; e.g. (RB<3).

Figure 4:
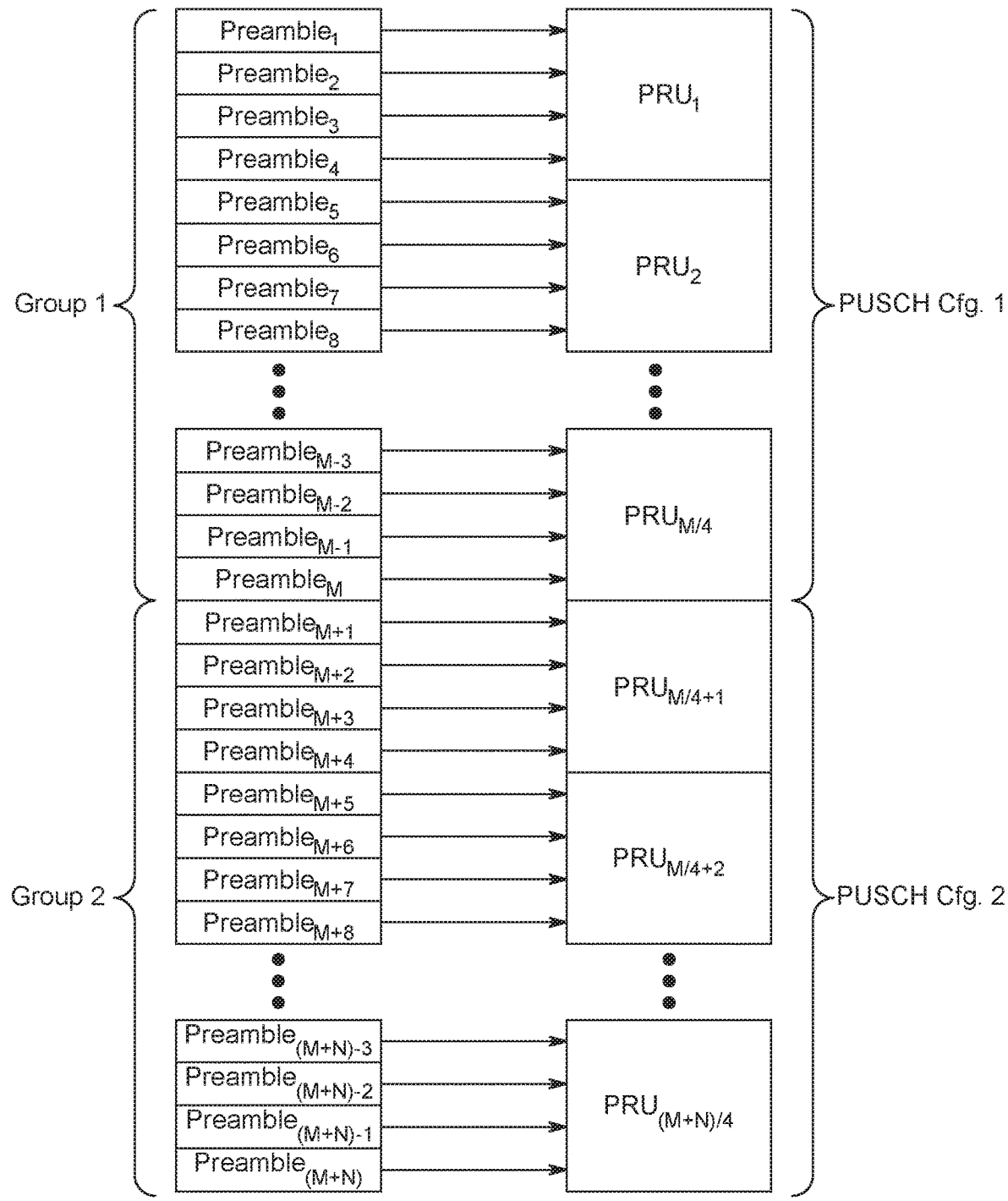
FIG. 4 is a diagram that shows Many-to-One Mapping between Preambles and PRUs in accordance with an exemplary embodiment.
Figure 5:
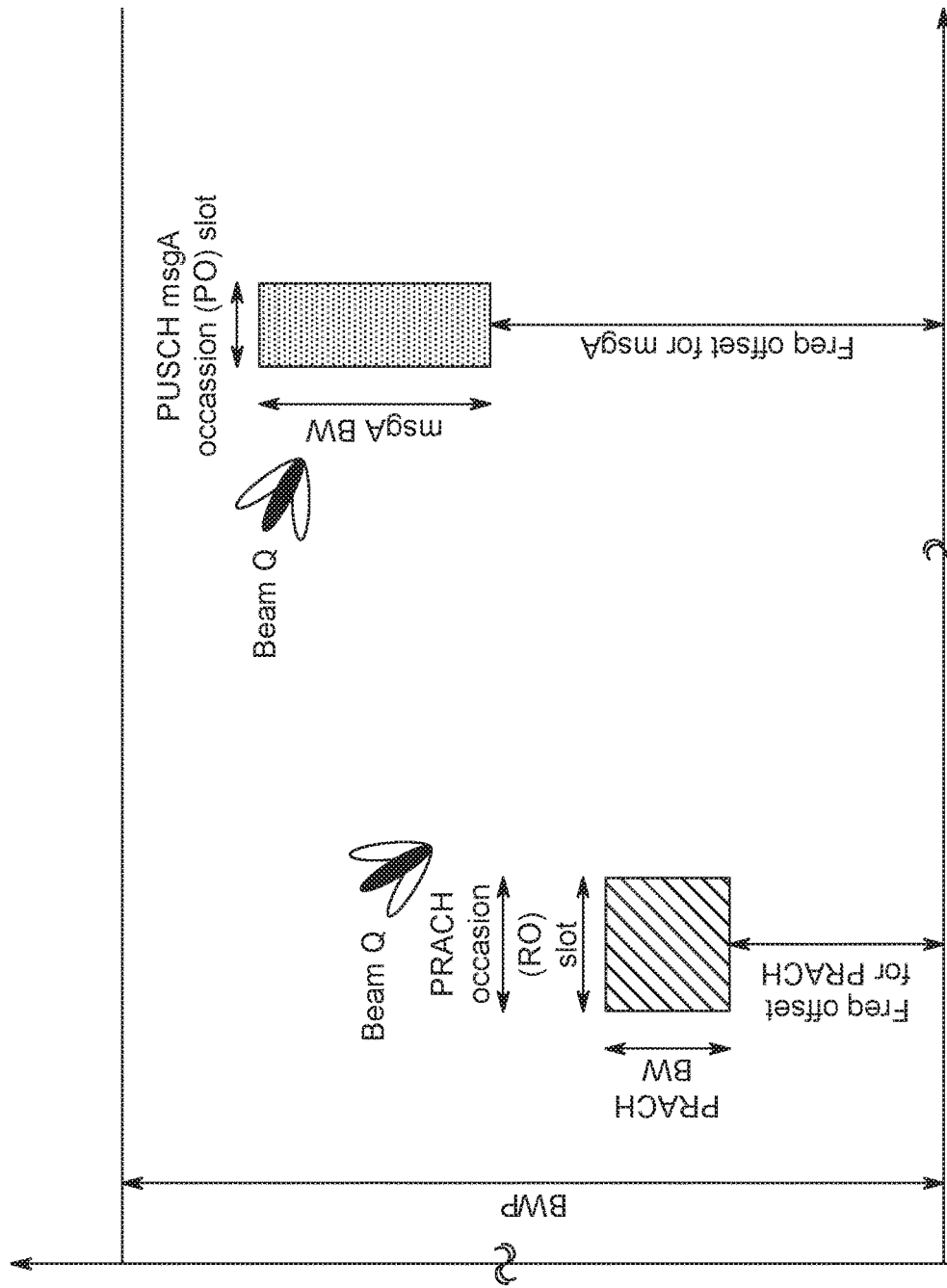
FIG. 5 is a diagram that shows PUSCH msgA occasion and PRACH occasion are separately configured by higher layer parameter in accordance with an exemplary embodiment.

FIG. 4 is an illustration of a many-to-one mapping, where the RO is comprised of (M+N) preambles partitioned into two preamble groups and 4 preambles are mapped to each This disclosure proposes the two options for PUSCH occasion of MsgA transmission:

Option 1: PUSCH MsgA occasions can be separately configured from PRACH occasions as shown in FIG. 5. In this option, SIB provides the higher layer parameter for PUSCH MsgA occasion and the PUSCH MsgA resource allocation can be alike to uplink transmission with configured grant. The PUSCH MsgA configuration can be based on the following higher layer parameters Time domain resource allocation is timeDomainAllocation indicating a combination of start symbol and length and PUSCH msgA occasion Frequency domain resource allocation is determined by the higher layer parameter frequencyDomainAllocation for a given resource allocation type indicated by resourceAllocation;

The MSC level IMCS is provided by higher layer parameter mcsAndTBS;

Number of DM-RS CDM groups, DM-RS ports and DM-RS sequence, and the antenna port value, the bit value for DM-RS sequence initialization are provided by antennaPort, dmrs-SeqInitialization, respectively;

Backoff indicator: indicating the time delay between a PUSCH msgA and the next PUSCH msgA.

When frequency hopping is enabled, the frequency offset between two frequency hops can be configured by higher layer parameterfrequencyHoppingOffset.

PUSCH msgA CRC can be scrambled by RA-RNTI which derived from the actual PRACH preamble transmit at a PRACH occasion. In addition, a UE 102 can assume the transmitted PRACH preamble in a PRACH occasion is quasi co-located (QCL) with the transmitted DM-RS with PUSCH msgA occasion.

Figure 6:
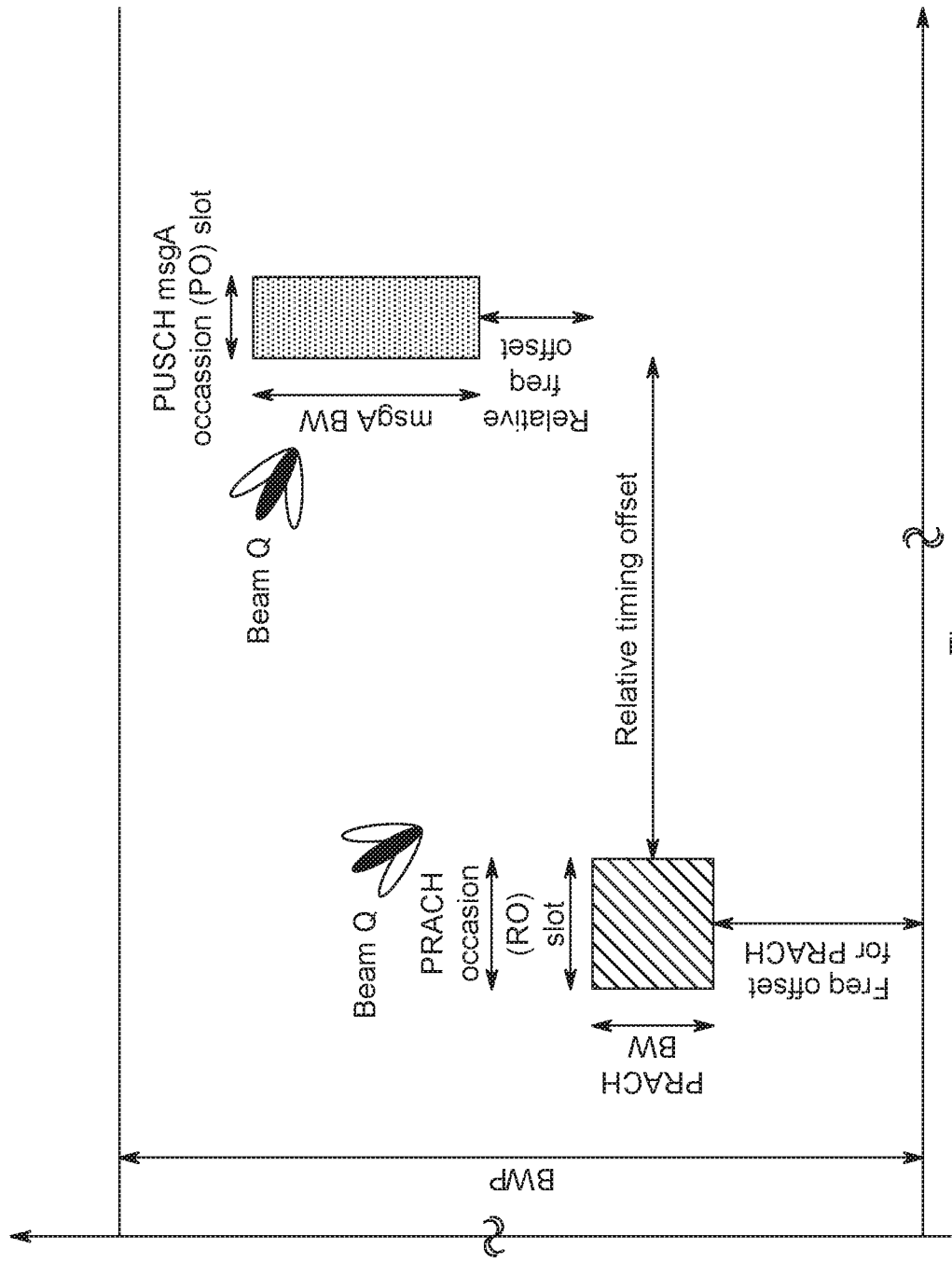
FIG. 6 is a diagram that shows PUSCH msgA occasion and PRACH occasion are relatively configured by higher layer parameter in accordance with an exemplary embodiment.

Option 2: PUSCH MsgA occasions can be relatively configured from PRACH occasions as shown in FIG. 6. In option 2, more higher layer parameters need to be signalling such as relative timing offset and frequency offset.

The association rule between the PRACH occasion and PUSCH MsgA occasion can be based on preamble indices assigned in PRACH occasion (RO) and number of PUSCH MsgA occasion(s) per PRACH occasion. When N≥1 SS/PBCH block associated with a single 2-step PRACH occasion (RO), R contention-based preambles with consecutive indexes associated with SS/PBCH block n, 0≤n≤N−1, per PRACH occasion start from preamble index $$\frac{n64}{N}.$$

Figure 7:
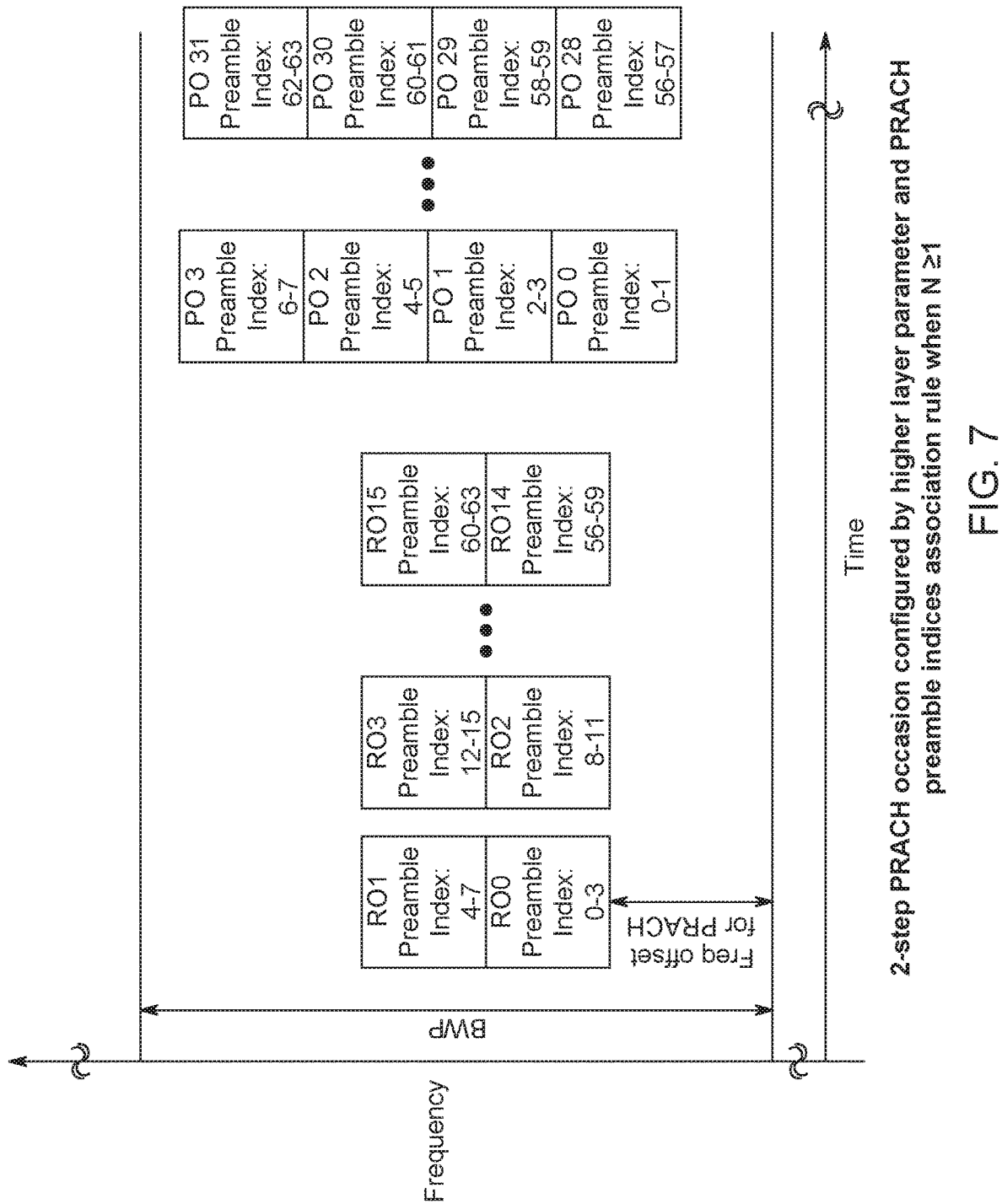
FIG. 7 is a diagram that shows 2-step PRACH occasion configured by higher layer parameter and PRACH preamble indices association rule when N≥1 in accordance with an exemplary embodiment.

For example, as shown in FIG. 7, 2-step PRACH occasion configuration from higher layer parameters: msg1-FDM=2 (i.e., FDM for RO is 2), and ssb-perRACH-OccasionAndCB-PreamblesPerSSB=4, thus $$N = \frac{64}{4} = 16.$$

The PRACH preambles indices in a PRACH occasion can be mapped to a single or multiple PUSCH msgA occasion (s). The number of PUSCH msgA occasion(s) per PRACH occasion denotes as Q. In FIG. 7, the Q is set as 2. The association rule between the PRACH occasion and PUSCH MsgA occasion transmission can be defined as follows PRACH preamble index in a RO assign to a PUSCH msg A occasion by $$\left\lfloor \frac{P_i}{Q} \right\rfloor$$

where $P_i$ denotes the PRACH preamble index in a PRACH occasion.

The DM-RS antenna port p in a PUSCH msgA occasion (PO) association rule with PRACH preamble index can be expressed as p=mod($P_i$, Q).

When N<1, a single SS/PBCH block can be associated with multiple (2-step) PRACH occasion(s). In this case, the proposed association rule when N≥1 is still valid.

One-to-Many Mapping Between Preambles and PUSCH Resource Units

Figure 8:
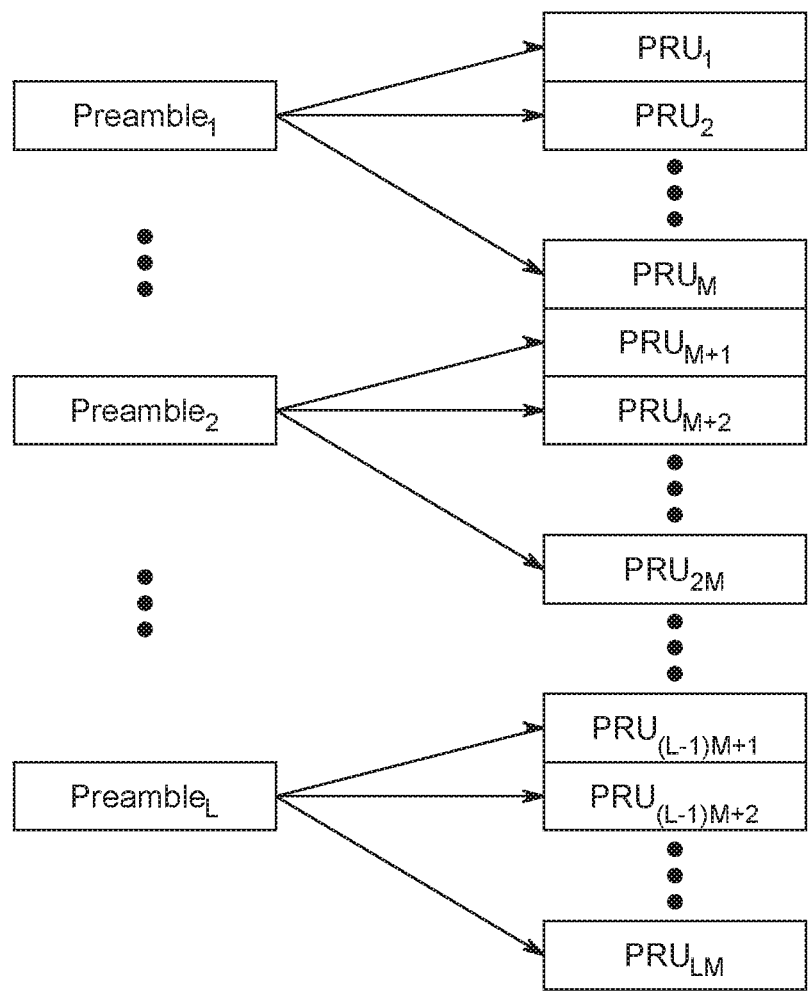
FIG. 8 is a diagram that shows One-to-Many Mapping between Preambles and PRUs in accordance with an exemplary embodiment.

For a one-to-many mapping, each Random Access preamble in a RO may be associated with multiple PRUs. FIG. 8 is an illustration of a one-to-many mapping, where the RO is comprised of L preambles, and each preamble is mapped to M PRUs.

In an exemplary embodiment, the multiple PRUs may each be associated with a different PUSCH configuration, thereby allowing the UE 102 to select the PUSCH configuration.

In an exemplary embodiment, multiple PUSCH configurations that correspond to different TBS sizes are associated with each Random Access preamble. Threshold parameters may be used by the UE 102 to select the appropriate PUSCH configuration based on the MsgA PDU size. Alternatively, threshold parameters based on DL signal quality or pathloss may also be used. In an exemplary embodiment, the selection may be based on a triggering event.

In an exemplary embodiment, the multiple PRUs may each be associated with the same PUSCH configuration, thereby facilitating FDM repetition of the MsgA PDU, which may be used to increase the reliability of the transmission. UEs 102 using such repetition may select the multiple PRUs from the M PRUs randomly, in order not to collide on all PRUs. For PDUs with lower reliability requirement, the UE 102 may select a single PRU from the M PRUs. For NR-U, one or more of the multiple PRUs may be associated with a different subband or BWP, thereby allowing the UE to select a PRU based on the result of an LBT procedure.

MsgA Transmission

After MsgA Resource Selection, the UE performs MsgA transmission, which is comprised of a preamble transmission and a PUSCH transmission.

MsgA transmission may be performed as follows:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
2> increment PREAMBLE_POWER_RAMPING_COUNTER by 1.
1> select the value of DELTA_PREAMBLE, where the value of DELTA_PREAMBLE may be determined based on the preamble format;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET_POWER.
1> indicate the PUSCH configuration for the selected PRU to the lower layers.
1> if the transmission is not being made for the CCCH logical channel:
2> indicate to the Multiplexing and assembly entity to include a C-RNTI MAC CE in the subsequent uplink transmission.
1> obtain the MAC PDU to transmit from the Multiplexing and assembly entity and store it in the MsgA buffer.
1> instruct the physical layer to transmit the MsgA PUSCH using the selected PRU.
1> perform the MsgB Reception procedure as described herein.

The RA-RNTI associated with the PRACH occasion in which the Random Access Preamble is transmitted, is computed as:
RA-RNTI=1+s_id+14×t_id+14×80×f_id+14×80×8×ul_carrier_id where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of specified in subclause 5.3.2 in TS 38.211, f_id is the index of the PRACH occasion in the frequency domain (0≤f_id<8), and ul_carrier_id is the UL carrier used for Random Access Preamble transmission (0 for NUL carrier, and 1 for SUL carrier). Note: In this example, the MsgA PUSCH power is calculated by lower layers and is relative to the value signaled via the UE variable PREAMBLE_RECEIVED_TARGET_POWER. Alternatively, the MsgA PUSCH may be based on its own targeted power level.

MsgB/Msg2 Reception

After MsgA transmission, the UE 102 monitors for a response; i.e. MsgB/Msg2, from the network within a configured window. If the C-RNTI MAC CE was included in MsgA, the UE 102 monitors the PDCCH of the SpCell for a response addressed to the C-RNTI. The response addressed to C-RNTI is used to signal a successRAR. The successRAR may include the following fields: Contention Resolution ID; C-RNTI, UL grant and TA command. The response addressed to C-RNTI may also include an RRC message that is transmitted by the network in response to a CCCH message included in MsgA.

If the C-RNTI MAC CE was not included in MsgA, the network cannot address the response to the C-RNTI. In this scenario, the response may be addressed to RA-RNTI, where the RA-RNTI is determined based on the PRACH occasion in which the MsgA preamble was transmitted. A separate search may be used to prevent legacy UEs from also receiving MsgA responses addressed to RA-RNTI, which may use new MAC PDU formats that are not compatible with legacy UEs. In an exemplary embodiment, a new RNTI; e.g. msgB-RNTI, may be used in this scenario. In an exemplary embodiment, a field may be included in the DL grant DCI to indicate if the response is for 2-step RACH or 4-step RACH.

The UE 102 also monitors the PDCCH of the SpCell for a response addressed to the RA-RNTI; e.g. Msg2. The response addressed to RA-RNTI may be used to signal a FallBackRAR or a Backoff Indication. Upon receiving a FallBackRAR, the UE 102 commences with transmission of Msg3 of the 4-step RACH procedure. The FallBackRAR may include the following fields: RAPID, UL grant for Msg3 transmission, TC-RNTI and TA command.

For the alternative where a new RNTI; e.g. msgB-RNTI, is used for the MsgB response when the C-RNTI MAC CE was not included in msgA, MsgB/Msg2 reception may be performed as follows:

```
1>start the ra-ResponseWindow configured in RACH-ConfigCommon at the first PDCCH
occasion as specified in TS 38.213 from the end of the Random Access Preamble transmission;
1>if the C-RNTI MAC CE was included in MsgA:
   2> monitor the PDCCH of the SpCell for a PDCCH addressed to the C-RNTI.
1>else:
   2> monitor the PDCCH of the SpCell for a PDCCH addressed to the msgB-RNTI
1>monitor the PDCCH of the SpCell for Random Access Response(s) identified by the RA-
RNTI while the ra-ResponseWindow is running.
1>if notification of a reception of a PDCCH transmission of the SpCell addressed to the C-RNTI
is received from lower layers:
   2> if the C-RNTI MAC CE was included in MsgA:
      3> if the timeAlignmentTimer associated with the TAG for the Serving Cell
      where the Random Access Preamble was transmitted is running;
         4> if the Random Access Response includes an UL grant:
            5> process the received UL grant value and indicate it to the
            lower layers;
            5> consider MsgB reception successful.
            5> consider this Random Access procedure successfully
            completed.
      3> else:
         4> if the Random Access Response includes a Timing Advance
         Command;
            5> process the received Timing Advance Command;
            5> consider MsgB reception successful.
            5> consider this Random Access procedure successfully completed.
1>if a downlink assignment has been received on the PDCCH for the msgB-RNTI and the MAC
PDU is successfully decoded:
   2> if the Random Access Response includes a UE Contention Resolution Identity;
   and
   2> if the UE Contention Resolution Identity matches the CCCH SDU transmitted in
MsgA:
      3> if this Random Access procedure was initiated for SI request:
         4> indicate the reception of an acknowledgement for SI request to
         upper layers.
      3> else:
         4> set the C-RNTI to the value of the C-RNTI in the Random Access
         Response;
         4> apply the following actions for the Serving Cell where the Random
         Access Preamble was transmitted:
            5> if the Random Access Response includes a Timing
            Advance Command;
               6> process the received Timing Advance Command.
            5> if the Random Access Response includes an UL grant:
               6> process the received UL grant value and indicate it
               to the lower layers.
      3> consider MsgB reception successful.
      3> consider this Random Access procedure successfully completed.
1>if a downlink assignment has been received on the PDCCH for the RA-RNTI and the received
TB is successfully decoded:
   2> if the Random Access Response contains a MAC subPDU with Backoff Indicator:
      3> set the PREAMBLE_BACKOFF to value of the BI field of the MAC
      subPDU using Table 7.2-1, multiplied with SCALING_FACTOR_BI.
   2> else:
      3> set the PREAMBLE_BACKOFF to 0 ms.
```

2> if the Random Access Response contains a MAC subPDU with Random Access Preamble identifier corresponding to the transmitted PREAMBLE_INDEX.
  2> apply the following actions for the Serving Cell where the Random Access Preamble was transmitted:
    3> process the received Timing Advance Command;
    3> indicate the preambleReceivedTargetPower and the amount of power ramping applied to the latest Random Access Preamble transmission to lower layers (i.e. (PREAMBLE_POWER_RAMPING_COUNTER − 1) × PREAMBLE_POWER_RAMPING_STEP);
    3> process the received UL grant value and indicate it to the lower layers;
    3> set the TEMPORARY_C-RNTI to the value received in the Random Access Response;
    3> store the MAC PDU transmitted in MsgA in the Msg3 buffer.
1>if ra-ResponseWindow configured in RACH-ConfigCommon expires, and if the Random Access Response containing Random Access Preamble identifiers that matches the transmitted PREAMBLE_INDEX has not been received, and if MsgB reception is not successful:
  2> consider the Random Access Response reception not successful;
  2> increment PREAMBLE_TRANSMISSION_COUNTER by 1;
  2> if PREAMBLE_TRANSMISSION_COUNTER = preambleTransMax + 1:
    3> if the Random Access Preamble is transmitted on the SpCell:
      4> indicate a Random Access problem to upper layers;
      4> if this Random Access procedure was triggered for SI request:
        5> consider the Random Access procedure unsuccessfully completed.
    3> else if the Random Access Preamble is transmitted on a SCell:
      4> consider the Random Access procedure unsuccessfully completed.
  2> if the Random Access procedure is not completed:
    3> select a random backoff time according to a uniform distribution between 0 and the PREAMBLE_BACKOFF;
    3> perform the Random Access Resource selection procedure after the backoff time.

Exemplary Signaling Procedures
SR Using 2-Step RACH

The Scheduling Request (SR) is used for requesting UL-SCH resources for a new transmission. If the MAC entity has no valid PUCCH resource configured for the pending SR, the MAC entity initiates a Random Access procedure on the SpCell and cancels the pending SR. In this scenario, a 2-step RACH may be used to obtain an UL grant to transmit the data for the logical channel(s) associated with the BSR that triggered the SR.

In an exemplary embodiment, the MsgA PDU includes a BSR and UE identity. A PHR may optionally be included as well, depending on the TB size associated with the MsgA PUSCH resources. Whether or not 2-step RACH may be triggered for an SR may be configured by higher layers; e.g. RRC, via broadcast or dedicated signaling The triggering of 2-step RACH for an SR may also be dependent on the LCH associated with the BSR that triggered the SR. Higher layer signaling may be used to indicate which LCHs are allowed to use 2-step RACH to trigger an SR. For example, the LogicalChannelConfig IE may include a flag to indicate whether or not 2-step RACH is used to trigger an SR. In an exemplary embodiment, this may be indicated as a choice between PUCCH or 2-step RACH as shown in the exemplary LogicalChannelConfig IE below. In an exemplary embodiment, whether or not 2-step RACH is used to trigger an SR may be configured per Logical Channel Group (LCG).

LogicalChannelConfig Information Element

| LogicalChannelConfig Information Element | |
|---|---|
| -- ASN1START | |
| -- TAG-LOGICALCHANNELCONFIG-START | |
| LogicalChannelConfig ::= | SEQUENCE { |
| ul-SpecificParameters | SEQUENCE { |
| priority    INTEGER (1..16), | |
| prioritisedBitRate | ENUMERATED {kBps0, kBps8, kBps16, kBps32, kBps64, kBps128, kBps256, kBps512, kBps1024, kBps2048,kBps4096,kBps8192,kBps16384, kBps32768, kBps65536, infinity}, |
| bucketSizeDuration | ENUMERATED {ms5, ms10, ms20, ms50, ms100, ms150, ms300, ms500, ms1000, spare7, spare6, spare5, spare4, spare3,spare2, spare1}, |
| allowedServingCells | SEQUENCE (SIZE (1..maxNrofServingCells-1)) OF ServCellIndex OPTIONAL, -- PDCP-CADuplication |
| allowedSCS-List | SEQUENCE (SIZE (1..maxSCSs)) OF SubcarrierSpacing OPTIONAL, -- Need R |
| maxPUSCH-Duration | ENUMERATED {ms0p02, ms0p04, ms0p0625, ms0p125, ms0p25, ms0p5, spare2, spare1} OPTIONAL, -- Need R |
| configuredGrantType1Allowed | ENUMERATED {true}    OPTIONAL, -- Need R |
| logicalChannelGroup | INTEGER (0..maxLCG-ID) OPTIONAL, -- Need R |
| schedulingRequest | CHOICE { |
| schedulingRequestID | SchedulingRequestId OPTIONAL, -- Need R |

-continued

| LogicalChannelConfig Information Element | |
|---|---|
| 2-stepRach<br>} OPTIONAL | BOOLEAN, -- Need R |
| logicalChannelSR-Mask | BOOLEAN, |
| logicalChannelSR-DelayTimerApplied | BOOLEAN, |
| ..., | |
| bitRateQueryProhibitTimer | ENUMERATED { s0, s0dot4, s0dot8, s1dot6, s3, s6,<br>s12,s30} OPTIONAL -- Need R |
| } OPTIONAL, -- Cond UL | |
| ... | |
| }<br>-- TAG-LOGICALCHANNELCONFIG-STOP<br>-- ASN1STOP | |

Figure 9:
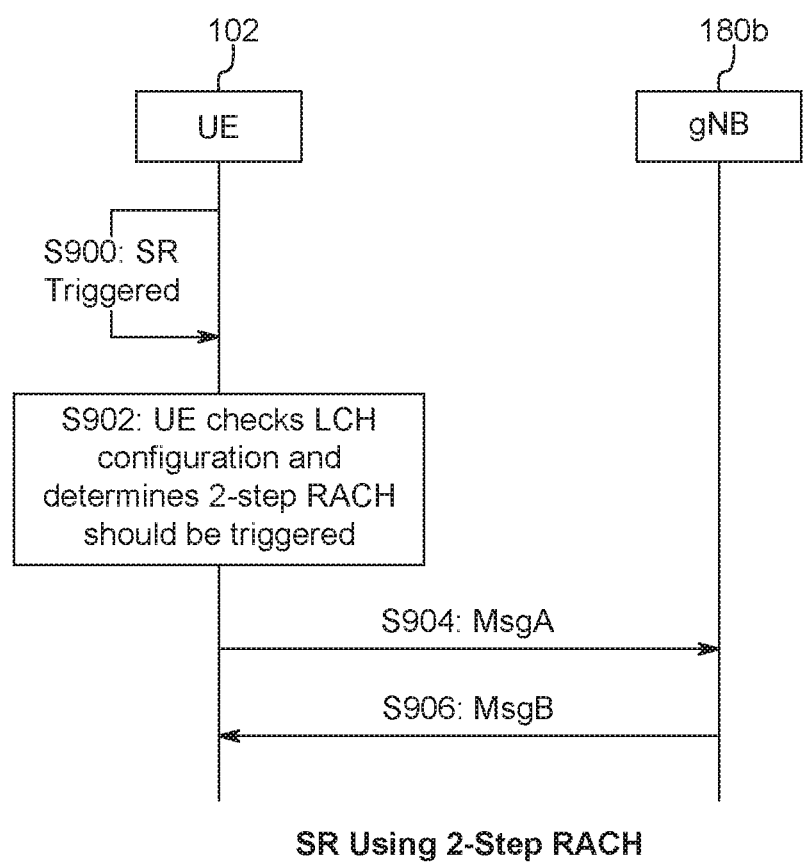
FIG. 9 is a diagram that shows SR Using 2-Step RACH in accordance with an exemplary embodiment.
Figure 10:
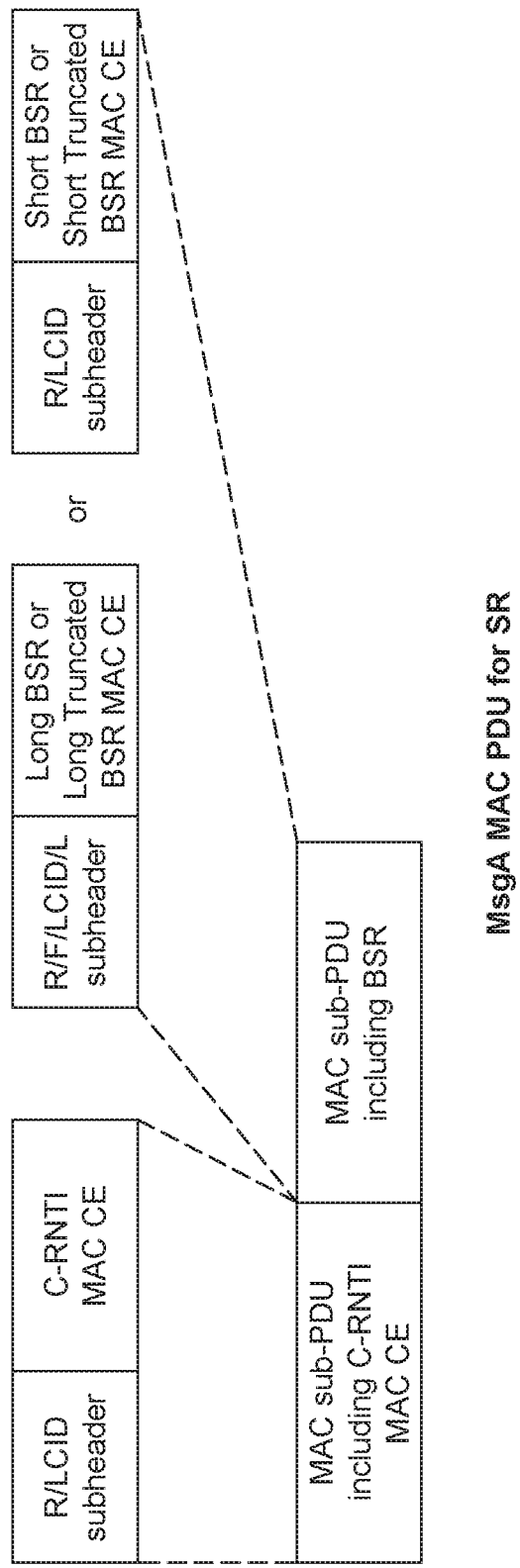
FIG. 10 is a diagram that shows a MsgA MAC PDU for SR in accordance with an exemplary embodiment.

A signaling diagram for an SR using 2-step RACH is shown in FIG. 9. Step S900: An SR procedure is triggered in response UL data arrival for a LCH that cannot be transmitted using the available UL-SCH resources, if any. Step S902: The UE 102 checks the LCH configuration and determines a 2-step RACH should be triggered for the SR. Step S904: The UE 102 transmits MsgA, which is comprised of a PDU that includes the BSR that triggered the SR and the UE identity; e.g. a C-RNTI MAC CE. After transmitting MsgA, the UE monitors the PDCCH for the MsgB/Msg2 response. An exemplary MsgA MAC PDU is shown in FIG. 10. Step S906: The UE 102 receives the MsgB response transmitted by the gNB 180b, where the MsgB response is comprised of an UL grant that is used to transmit the UL data that triggered the SR.

Handover Using 2-Step RACH

The Random Access procedure may be triggered by RRC upon synchronous reconfiguration; e.g. handover, to establish UL synchronization with the target cell. After UL synchronization is established with the target cell, the network schedules UL transmission(s) that are used by the UE 102 for transmission of the RRCReconfigurationComplete message to complete the handover procedure. To reduce the latency associated with the handover procedure, the 2-step RACH procedure may be used for transmission of the RRCReconfigurationComplete message.

In an exemplary embodiment, the handover command; i.e. an RRCReconfigurationRequest message that includes reconfigurationWithSync parameters, may be used to configure the UE 102 with a MsgA preamble and PUSCH resources that are used by the UE 102 for transmission of the RRCReconfigurationComplete message.

Request for On-Demand System Information Using 2-Step RACH

Figure 11:
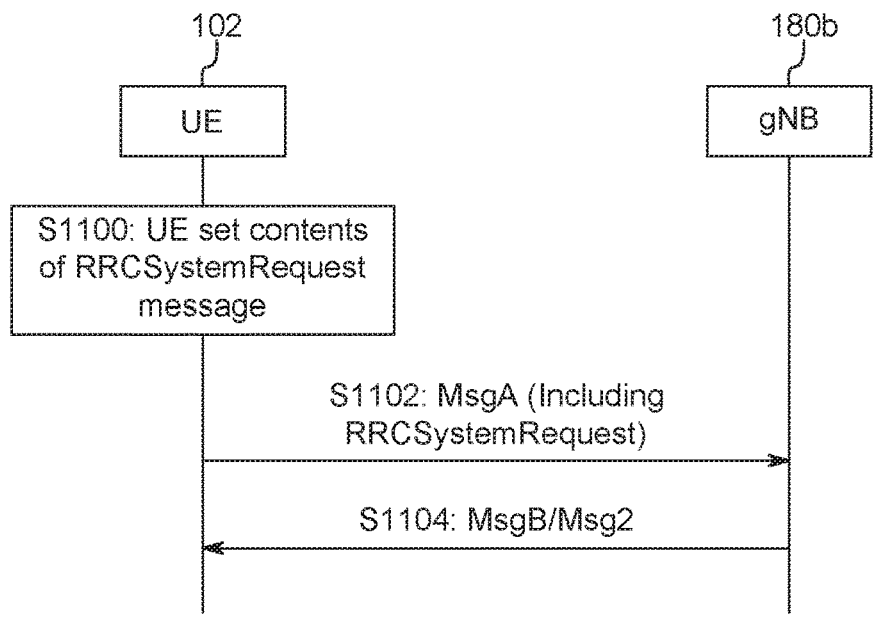
FIG. 11 is a signal diagram that shows a Request for On-Demand System Information Using 2-Step RACH in accordance with an exemplary embodiment.

The RRCSystemInfoRequest may be used to request the SI message(s) that the UE 102 requires to operate within the cell. To reduce the latency associated with requesting on-demand SI, the 2-step RACH procedure may be used for transmission of the RRCSystemInfoRequest message. Higher layer signaling; e.g. RRC signaling, may be used to indicate if requesting on-demand SI using the 2-step RACH procedure is supported in the cell. A signaling diagram for request of on-demand SI using 2-step RACH is shown in FIG. 11. Step S1100: The UE 102 sets the contents of RRCSystemInfoRequest message to indicate the SI message(s) that the UE 102 requires to operate within the cell, and for which si-BroadcastStatus is set to notBroadcasting. Step S1102: If on-demand SI using 2-step RACH is supported, the UE 102 triggers a 2-step RACH procedure, where the MsgA payload is comprised of the RRCSystemInfoRequest message. Step S1104: The UE performs MsgB/Msg2 reception using the procedures described herein.

Solutions for MsgA PUSCH Reception for Unsynchronized UEs

Distance based Open-Loop Timing Advance Value Calculation

Typically, in cellular systems, a UE 102 initially acquires UL synchronization through random access procedure during which the base station signals to the UE 102 as part of the random access response message an initial timing advance value as an absolute time advance value of the start of the uplink frame relative to the start of the corresponding downlink frame. The UE 102 then continues to maintain uplink synchronization with the base station through periodic UL transmission controlled by a timing advance timer, which allows the base station to determine if adjustment to the time advance is needed and if needed, the base station updates into the UE 102, the timing advance value by signaling to the UE 102 a time advance value relative to the current timing advance value in the UE 102.

As described in the second issue to be addressed above, in 2-step RACH procedure, the MsgA PUSCH transmission may take place before reception of a timing advance command with an initial timing advance value from the base station. This will cause potential problems for MsgA reception in the base station and in order to avoid such MsgA reception problems, a new method to determine an initial timing advance value is needed. In this subsection, the present disclosure proposes a method denoted distance based open loop timing advance value calculation that can be used by the UE to autonomously determine an initial timing advance value as opposed to getting an initial timing advance value from the base station. For scenarios where the distance d between the UE and the network node for e.g. gNB or TRP, can be estimated, an open-loop initial timing advance value $T_{TA\_open\_loop}$ may be calculated by the UE. For a SCS of $2^\mu \cdot 15$ kHz, the open loop initial timing advance value may be calculated in units of seconds as follows:

$$T_{TA\_open\_loop} = \frac{d}{c};$$

The initial timing advance value may be expressed in units of $T_c$ as follows:

$$N_{TA\_open\_loop} = \frac{d}{c \cdot T_c};$$

Furthermore, in order to reduce the number of bits required for the signaling by the base station to the UE 102 of the initial timing advance value in unit of $T_c$, the initial timing advance value may be expressed in units of the quantity $(16 \cdot 64 \cdot T_c)/2^\mu$ as follows:

$$T_{TA\_open\_loop} = \frac{d}{c} \cdot \frac{2^\mu}{16 \cdot 64 \cdot T_c}$$

where c is the speed of light, µ is subcarrier configuration as defined in Table 4.2-1 of [6] and $T_c$ is the basic unit time for NR as defined in [6]. The possible values of the initial timing advance value $T_A$ in the current NR specification TS 38.213 [5] is 0, 1, 2, ..., 3846. The possible values of the open loop initial timing advance $T_{A\_open\_loop}$ may also be set to 0, 1, 2, ..., 3846.

Alternatively, the open loop initial timing advance value may be set to larger range values for example in the case of larger cells such as satellite cells. In another alternative, the range of the open loop initial timing advance value may be set to range values small than the currently specified range for e.g. in support of small radius cell or low capability devices. For example, the $T_{A\_open\_loop}$ possible values may be 0, 1, 2, ... $(2^N-1)$, where N is the number of bits used for the representation of $T_A$_open_loop. For example, if N=4 bits are used, the possible values for $T_{A\_open\_loop}$ are 0, 1, 2, ... 15.

A timing advance offset for a serving cell may be configured into the UE 102. The UE 102 may apply such a serving cell specific time advance offset to the proposed calculated open loop initial timing advance values above.

The distance d may be calculated based on an estimate of the location of the UE 102 and an estimate the location of the network node. A UE 102 may use GPS or any other available technique to obtain an estimate of its location. For scenarios where the UE 102 is fixed, the location of the UE 102 may be preconfigured.

The location of the network node(s) may be broadcasted to the UE 102 or preconfigured. For NTNs, the location of the network nodes; e.g. satellites, may be based on satellite ephemeris. In one example, the open-loop timing advance command is only applied for the PUSCH transmission, thereby allowing the network to calculate a timing advance command based on the received preamble. The timing advance command calculated by the network may then be signaled to the UE 102 in the MsgB/Msg2 response and applied by the UE 102.

In an exemplary embodiment, the open-loop timing advance command is applied for the Random Access preamble and PUSCH transmissions. Such a solution may be applied for NTNs, where the propagation delay is expected to be very large. Applying an open-loop timing advance command in this scenario will help to align the transmissions from UEs 102 at the cell edge and the cell center when received at the network node; e.g. satellite, thereby mitigating the effects of overlapping preamble reception windows for the ROs, as described above in the fourth issue to be addressed. Adjustment to the current timing advance, for example, the open loop initial timing advance value may be configured into the UE 102 by the base station (e.g., gNB 180*b*). Assuming M bits are used to represent adjustment $T_{A\_Adjustment}$ to the current timing advance value, $T_{A\_Adjustment}$ may take the following possible values: 0, 1, 2, ..., $(2^M-1)$. The UE 102 may calculate the adjustment to the current timing advance value expressed in unit of $T_c$, $N_{TA\_Adjustment}$ as $N_{TA\_Adjustment}=(T_{A\_Adjustment}-\text{floor}((2M-1)/2))\cdot(16\cdot64\cdot T_c)/2^\mu$. Furthermore, the UE may calculate the new timing advance value in units of $T_c$, $N_{TA\_new}$ as $N_{TA\_new}=N_{TA\_old}+N_{TA\_Adjustment}$, where the $N_{TA\_old}$ is the current timing advance value in the UE 102.

The accuracy of the UE 102 and/or network node position estimates and/or UE mobility state may be considered when determining if an open-loop timing advance command should be applied. For scenarios where the accuracy exceeds a threshold, the UE 102 may use 4-step RACH instead of 2-step RACH.

In an exemplary embodiment, an initial adjustment to the timing advance value may be calculated by the network and provided to the UE 102 via the handover command or conditional handover command. The UE 102 would then apply that adjustment when executing the handover. In an exemplary embodiment, the UE 102 may apply the received adjustment to a new open loop initial timing advance value calculated relative to the target cell. In another exemplary embodiment, the adjustment may be applied to the current timing advance value relative to the source cell. The timing advance command may also indicate whether the timing advance adjustment value is applied to a current timing advance determined relative to the source cell or to a current timing advance determined relative to the target cell.

Determination of Timing Advance Based on a Proximity UE Timing

A UE 102 may share location, distance and/or timing advance command information with other UEs or network entities for e.g. a road side unit (RSU) in proximity for example over the sidelink interface. In an exemplary embodiment, the information is shared by a UE 102 that has already achieved uplink synchronization e.g. a UE in RRC_CONNECTED, with UEs that have not received uplink synchronization; e.g. UEs in RRC_IDLE/RRC_INACTIVE. The information received by an unsynchronized UE could then be used by this UE 102 to determine an initial timing advance value.

In an exemplary embodiment, a UE 102 that has acquired uplink synchronization with a gNB may proactively signal one or more of the following information: its (absolute) timing advance value with respect to its serving cell, information of its serving cell such as the identity of its serving cell, information about the gNB which control the serving cell such as the identity of the gNB, the location information of the synchronized UE. The signaling may be a common signaling for example system information broadcast signaling, or the signaling may be a dedicated signaling. The signaling may be over the sidelink interface.

In an exemplary embodiment, an unsynchronized UE may signal a request for timing advance information or timing advance assistance information from UEs in proximity. Such signaling may be common signaling such as broadcast signaling or dedicated signaling for e.g. if there is a sidelink connection between the unsynchronized UE and a synchronized UE. The signaling may be over the sidelink interface. The request may carry one or more of the following information: the location of the unsynchronized UE, information about the serving cell of the unsynchronized UE such as the serving cell identity, information about the gNB 180*b* which control the serving cell of the unsynchronized UE such as the gNB identity. In response to the request, a synchronized UE may signal to the unsynchronized UE, one or more of the following information: its (absolute) timing advance value with respect to its serving cell, information of its serving cell such as the identity of its serving cell, information about the gNB 180*b* which control the serving cell such as the identity of the gNB 180b, the location information of the synchronized UE. The signaling may be a common signaling for example system information broadcast signaling, or the signaling may be a dedicated signaling. The signaling may be over the sidelink interface.

In an exemplary embodiment, a group may be formed, where the group lead acquires UL synchronization, and then signals one or more of the following information using group/multicast signaling: its (absolute) timing advance value with respect to its serving cell, information of its serving cell such as the identity of its serving cell, information about the gNB 180b which control the serving cell such as the identity of the gNB 180b, the location information mobility state and/or trajectory of the group lead.

Determination of Timing Advance Based on Assistance Information from gNB

To assist a UE 102 in determining an initial timing advance value, the gNB 180b may broadcast assistance information. For example, a cell may broadcast a set of distance ranges wherein the distance is relative to the cell center, and a mapping between distance range and potential timing advance value(s). Each distance range within the set of distance ranges may be defined by a minimum distance relative to the cell center and maximum distance relative to the cell center. In an exemplary embodiment, the gNB 180b may broadcast a set of geographical areas and a mapping between those geographical area and potential timing advance value(s). In an exemplary embodiment, the gNb 180b may broadcast of set of location information and a mapping between this location information and potential timing advance value(s).

The UE 102 uses the received information to determine an initial timing advance value in replacement of a timing advance value that would be acquired through the random access procedure. In an exemplary embodiment, the UE 102 may use the received value as is as the initial timing advance value. In an exemplary embodiment, the UE 102 may use the received value in combination with timing advance value determined based on proximity UE timing (See the above section entitled "Determination of Timing Advance based on a Proximity UE Timing), or in combination within open loop based initial timing advance value (see the above section entitled "Distance based Open-Loop Timing Advance Value Calculation).

In an exemplary embodiment, in the case of NTNs, the cell; e.g. satellite, drone, UAV, etc., broadcasts a timing advance value that corresponds to the propagation delay between the cell and the center of the coverage area on the earth. A UE 102 may then determine its initial timing advance by computing its distance from the center of the cell's coverage area and calculating an additional timing advance component used to account for the additional propagation delay that results from not being in the center of the cell's coverage area. The initial timing advance value use by the UE 102 would then be the sum of the value broadcast by the network and the compensation factor calculated by the UE 102.

Solutions for BFR Latency and Radio Resource Efficiency

In this subsection, solutions are provided to perform BFR to address the problems associated with radio resource efficiency and latency that exist for the R15 BFR procedure as described above in third issue to be addressed.

BFR Using 2-Step RACH

In an exemplary embodiment, a UE 102 is configured with a dedicated preamble that is used to perform a CF 2-step RACH when a RACH procedure is initiated in response to beam failure detection to perform beam failure recovery. The MAC PDU signaled by the UE 102 in MsgA includes an indication of the selected candidate beam. This indication may be signaled as a MAC CE or a field in the MAC subheader.

Alternatively, a CB 2-step RACH procedure may be used to perform BFR. In this example, the UE 102 selects a random access preamble from a set of contention based random access preambles that may be used by other UEs when performing a RACH procedure. The set of contention based preambles may be used solely for the purpose of BFR or may also be used when performing a RACH procedure initiated for other triggers. In this example, the MAC PDU signaled by the UE 102 in MsgA includes an indication of the UE's identity and the selected candidate beam. The indications may be signaled in MAC CEs and/or fields in the MAC subheader.

After transmitting MsgA, the UE 102 monitors the PDCCH for the MsgB/Msg2 response. Reception of a MsgB response addressed to the UE's C-RNTI is used to indicate successful completion of the 2-step BFR procedure.

Figure 12:
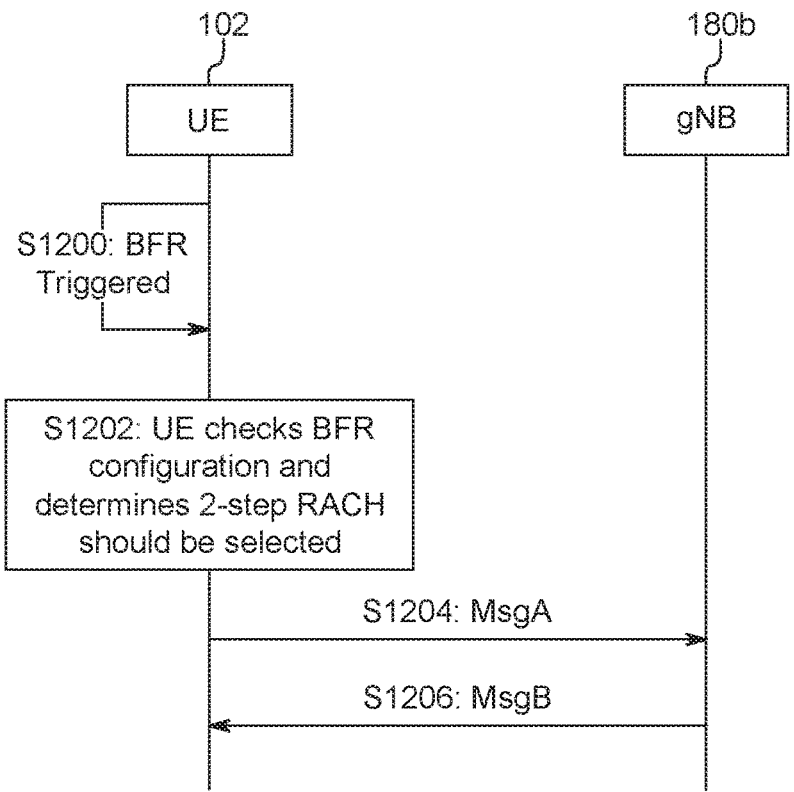
FIG. 12 is a signal diagram that shows BFR Using 2-Step RACH in accordance with an exemplary embodiment.

A signaling diagram for BFR using 2-step RACH is shown in FIG. 12.

Step S1200: A RACH procedure is initiated in response to beam failure detection.

Step S1202: The UE checks the BFR configuration and determines a 2-step RACH procedure should be selected.

Step S1204: The UE transmits MsgA, which is comprised of a MAC PDU that e includes an indication of the selected candidate beam. For scenarios where a CB BFR procedure is performed, the MAC PDU also includes an indication of the UEs identity. After transmitting MsgA, the UE monitors the PDCCH for the MsgB/Msg2 response.

Step S1206: The UE receives the MsgB response transmitted by the gNB that is addressed to the UE's C-RNTI, where the MsgB response may include an UL grant, timing advance command, etc. The MsgB response may also include signaling of parameters that are used to facilitate beam management; e.g. indicating an CSI-RS configuration use for a new beam or a candidate beam to switch to. For example, the network may activate and deactivate the configured TCI states for PDSCH of a Serving Cell by including the TCI States Activation/Deactivation for UE-specific PDSCH MAC CE in the MsgB response. And in another example, the network may indicate a TCI state for PDCCH reception for a CORESET of a Serving Cell by including the TCI State Indication for UE-specific PDCCH MAC CE in the MsgB response.

BFR for SCell Using 2-Step RACH

The UE 102 may perform BFR for an SCell using the 2-step RACH procedure. In this scenario, MsgA may include an indication of the cell for which the BFR is being performed, e.g. a serving cell index, and an indication of the selected beam, e.g. a candidate beam RS index. The UE 102 may be configured with a dedicated preamble per cell or group of cells, for which the UE 102 would report beam failure on the considered cell. The network would then be able to implicitly identify the UE 102 based on the detection of the reserved preamble(s). Alternatively, if a dedicated preamble not used, then MsgA may also include the identity of the UE 102; e.g. a C-RNTI MAC CE.

The UE 102 may provide an indication to the network for scenarios where a suitable beam is not found. In an exemplary embodiment, this is indicated implicitly by not including an indication of the selected beam in MsgA. Alternatively, an explicit indication may be provided; e.g. a reserved value for the candidate beam or a flag to indicate if a candidate beam was/was not selected. And in other embodiments, the UE 102 may report the best beam for scenarios where a suitable beam is not found. The UE 102 may also include measurement metrics in the MsgA transmission to help facilitate beam management. For scenarios where a suitable beam is not found, the MsgB response may include an SCell deactivation command.

A procedure to perform BFR for an SCell using 2-step RACH may be defined as follows:
1. Beam failure is detected on a cell.
2. The UE 102 determines if it shall transmit an SR carried by a PUCCH dedicated to BFR ("dedicated SR") or MsgA.
3. If the UE 102 transmits a dedicated SR:
    a. The UE 102 receives a PUSCH grant.
    b. The UE 102 transmits beam failure recovery request (or the second part thereof, with the dedicated SR being the first part) on the PUSCH, as a MAC CE or piggy-backed UCI.
    c. The UE 102 receives the beam failure recovery response (optional)
4. Else (UE transmits a MsgA):
    a. The UE 102 performs the 2-step RACH procedure, with the beam failure recovery request (or the second part thereof, with the MsgA PRACH being the first part) being included in the MsgA PUSCH, as a MAC CE or piggy-backed UCI.

In the second step, the UE's 102 determination may be based on the UE configuration. For example, the UE's RRC configuration, e.g. of the active UL BWP of the SpCell, determines if a dedicated SR or MsgA should be used. In another example, the UE may determine if a dedicated SR or MsgA should be used, e.g. based on expected latency or if the UE is currently UL synchronized. The network response may be signaled on the SpCell or an SCell.

Solutions for Impact of LBT Failures on 2-Step RACH for NR-U

In this subsection, procedures are described that may be used to address the problems associated with acquiring access to an unlicensed channel for MsgA transmissions as described above in the fifth issue to be addressed.

Figure 13:
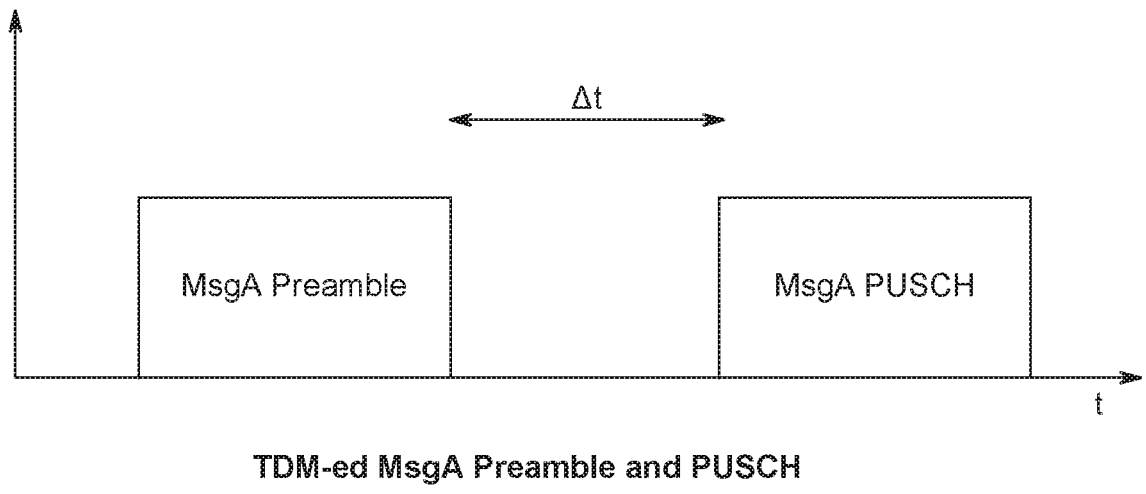
FIG. 13 is a diagram that shows TDM-ed MsgA Preamble and PUSCH.

Channel Access Procedures for MsgA Configurations with TDM-ed Preamble and PUSCH For configurations where the MsgA preamble and PUSCH are TDM-ed, and there is a non-zero duration between the preamble and PUSCH transmission, as shown in FIG. 13, the channel access procedure; i.e. LBT category, that is performed prior to the PUSCH transmission may be the same as the channel access procedure performed prior to the preamble transmission; e.g. Cat4 or Cat2 LBT.

Alternatively, the channel access procedure performed prior to the PUSCH transmission may depend on the duration of the gap. For example, for scenarios where the duration is less than a threshold, Cat1 LBT; i.e. No LBT, may be performed prior to the PUSCH transmission. And for scenarios where the duration is greater than or equal to the threshold, Cat2 or Cat4 LBT may be performed. In an exemplary embodiment, the channel access procedure performed prior to the PUSCH transmission may be dependent on the CAPC of the data being transmitted on the MsgA PUSCH or the event that triggered the Random Access procedure. The threshold and/or the channel access procedure to be performed prior to the PUSCH transmission may be predefined; e.g. specified per the standard, or configured by higher layers; e.g. RRC, using broadcast or dedicated signaling.

Figure 14:
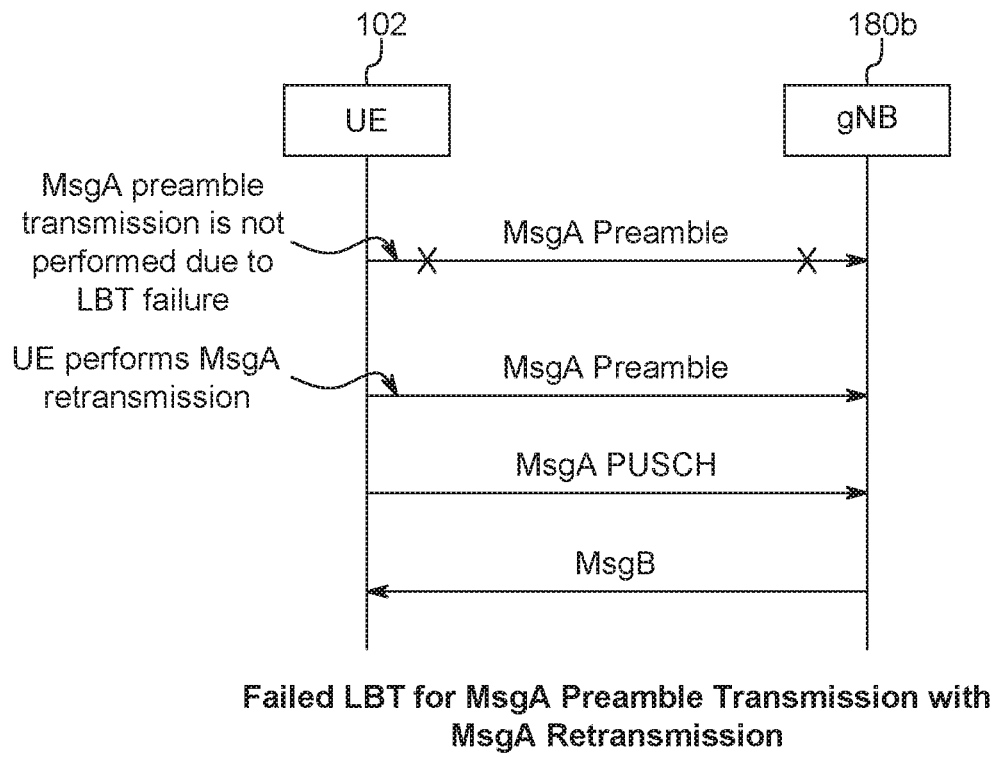
FIG. 14 is a signal diagram that shows Failed LBT for MsgA Preamble Transmission with MsgA Retransmission.

If the channel access procedure performed prior to the preamble transmission fails, neither the preamble nor the PUSCH are transmitted. In this scenario, an indication of the failure is provided to the MAC and the UE variables PREAMBLE_TRANSMISSION_COUNTER and PREAMBLE_POWER_RAMPING_COUNTER are not incremented. The UE 102 returns to MsgA resource selection and continues with another attempt to perform MsgA transmission as shown in FIG. 14.

Figure 15:
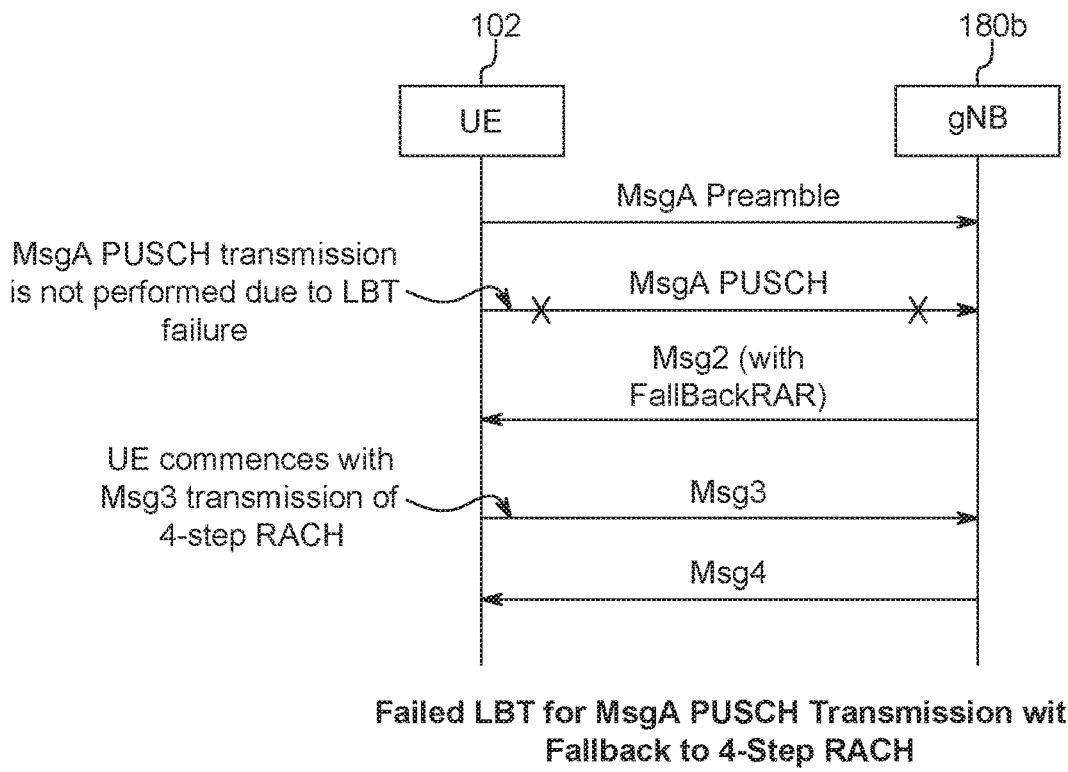
FIG. 15 is a signal diagram that shows Failed LBT for MsgA PUSCH Transmission with Fallback to 4-Step RACH.

If the preamble is transmitted but the channel access procedure performed prior to the PUSCH transmission fails, an indication of the failure is provided to the MAC. In this case, the UE variables PREAMBLE_TRANSMISSION_COUNTER and PREAMBLE_POWER_RAMPING_COUNTER are incremented since the preamble was transmitted. The UE 102 then performs with MsgB/Msg2 reception. However, the UE 102 may only monitor for Msg2 since the PUSCH was not transmitted. If the preamble is detected, the network responds with Msg2 that includes a FallBackRAR, at which point the UE 102 commences with Msg3 transmission of the 4-step RACH procedure. If the Msg2 is not received before the ra-ResponseWindow expires, the UE returns to MsgA resource selection to continue with another attempt to perform MsgA transmission. An illustration of the scenario where the channel access procedure for the PUSCH fails and Msg2 is used to trigger fallback to the 4-step RACH procedure is shown in FIG. 15.

Figure 16:
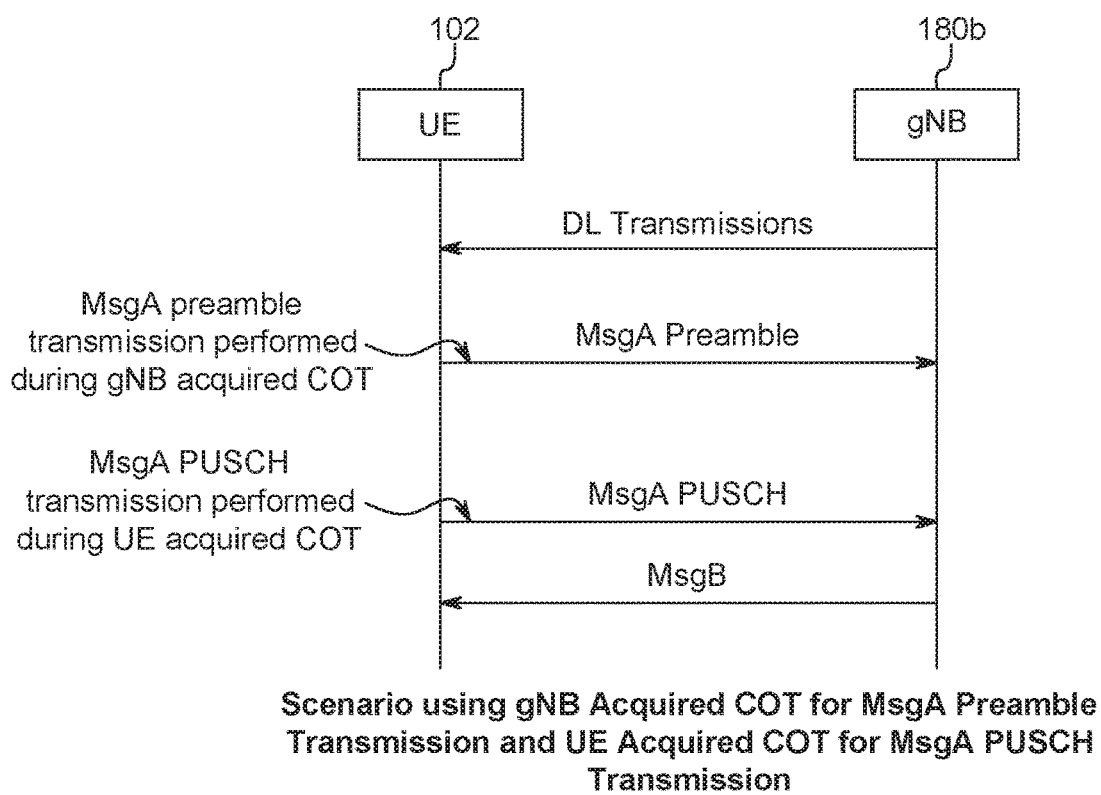
FIG. 16 is a signal diagram that shows a Scenario using gNB Acquired COT for MsgA Preamble Transmission and UE Acquired COT for MsgA PUSCH Transmission.

In an exemplary embodiment for the one-to-many mapping RO and POs case, the UE 102 may attempt to access the channel again to transmit PUSCH in any of the configured POs before the beginning of monitoring window of MsgB. If the UE 102 commences monitoring MsgB, the UE 102 may attempt to transmit PUSCH in between the PDCCH monitoring occasions in RAR window as long as the no response from gNB is received and until the end of RAR monitoring window. For any PO, if the UE 102 fails to access the channel at the beginning of PO, the UE 102 may attempt to access partial of PO depending on LBT outcome at the UE 102. In an exemplary embodiment, a gNB 180*b* acquired COT is used for the MsgA preamble transmission, and a UE 102 acquired COT is used for the MsgA PUSCH transmission. Thereby allowing a more aggressive channel access procedure to be performed prior to the MsgA preamble transmission; e.g. Cat1 or Cat2, and a less aggressive one to be performed prior to the PUSCH transmission; e.g. Cat4, as shown in FIG. 16.

In this example, MsgB may be transmitted in a during the UE acquired COT or a gNB acquired COT. For scenarios where the UE acquired COT is used for the MsgB transmission, the full contents of MsgB may transmitted in a single message. Alternatively, the MsgB transmission may be split into two parts. In an exemplary embodiment, MsgB is split into a first part that is comprised of DFI and a second part that is comprised of the other content.

The indication of channel access procedure failures may be used as an input to a procedure to detect consistent UL LBT failures. For example, if the number of UL LBT failures during a specified time exceeds a threshold, an indication of the problem may be provided to higher layers.

Methods to Prevent Inter-MsgA Blocking

If RO/PO are contiguous in time domain with no gaps between them, then the UE 102 attempts to access the later RO/PO may be blocked by the UE(s) using the earlier RO/PO which the disclosure calls inter-MsgA blocking. In NR Rel. 15, if multiple ROs are configured in a RACH slot, they have to be contiguous with no gaps between them. To resolve this problem, time gaps may be introduced between consecutive ROs/POs. This gap can be signaled by high layer signaling, e.g., RRC parameter such as RACH_gap. The time gap may start from the last OFDM symbol of the former RO/PO to the first OFDM symbol of the latter RO/PO.

Alternatively, if RO/PO are contiguous in the time domain with no gaps, then the process introduces the invalid RO/PO which the UE 102 may not use. The invalid RO/PO falls in between other two RO/PO such that the UE 102 selects the last RO/PO that will not be blocked by UEs using the previous RO/PO. The invalid RO/PO may be signaled to the UE 102 by high layer signaling, e.g., RRC parameter such as invalid_RO_PO which set to even or odd. For example, if a RACH slot contains three ROs and invalid_RO_PO is set to even, then the first and third RO with RACH slot can be used while the second RO is invalid.

Methods to Transmit MsgA Preamble and PUSCH on Different Beams

The preamble and PUSCH of MsgA may be transmitted on the same or different beams. Therefore, if the beam carrying MsgA preamble is not available, then the UE 102 may attempt to transmit MsgA preamble on the same beam again in the RO. After certain number of attempts, the UE 102 may attempt to transmit MsgA preamble on different beam even if RO is not associated with best SSB. The maximum number of MsgA preamble transmission attempts on the same beam may be signaled by high layer signaling.

An exemplary embodiment of the present disclosure provides a first apparatus (e.g., UE 102) in a wireless communication system. The first apparatus includes circuitry (e.g., processor 118, memory 130, 132, transceiver 120, etc.)(see FIG. 1F) configured to trigger a Random Access Channel (RACH) procedure; select a two-step RACH procedure from among a plurality of RACH procedures as a RACH type to be performed; select a MsgA transmission resource; transmit a MsgA; and monitor for a network response from a second apparatus (e.g., gNB 180b).

In an exemplary embodiment, the circuitry is configured to: receive a first threshold from the second apparatus; and select the two-step RACH procedure as the RACH type based on a downlink (DL) signal quality being above the first threshold.

In an exemplary embodiment, the DL signal quality is Synchronization Signal-Reference Signal Received Power (SS-RSRP) or Channel State Information-Reference Signal Received Power (CSI-RSRP).

In an exemplary embodiment, the circuitry is configured to: select the two-step RACH procedure as the RACH type based on a logical channel being associated with a scheduling request that triggered the RACH procedure; and receive, from the second apparatus, a mapping between a logical channel and the RACH type.

In an exemplary embodiment, the circuitry is configured to: receive, from the second apparatus, a second threshold; and select the MsgA transmission resource, wherein the selecting of the MsgA transmission resource includes selecting a Synchronization Signal Block (SSB) with SS-RSRP above the second threshold.

In an exemplary embodiment, the selecting of the MsgA transmission resource includes selecting a Random Access Preamble randomly from Random Access Preambles associated with the selected SSB.

In an exemplary embodiment, the selecting of the MsgA transmission resource includes selecting a preamble group based on the SS-RSRP, and a first preamble group is selected if the SS-RSRP is above a third threshold, and a second preamble group is selected if the SS-RSRP is equal to or below the third threshold, wherein the first apparatus receives the third threshold from the second apparatus.

In an exemplary embodiment, the circuitry monitors for the network response, and the monitoring for the network response includes monitoring for a network response addressed to msgB-Radio Network Temporary Identifier (msgB-RNTI).

In an exemplary embodiment, the circuitry is configured to: receive a fourth threshold from the second apparatus; and perform a four-step RACH procedure when a number of unsuccessful attempts of the two-step RACH procedure is equal to the fourth threshold.

In an exemplary embodiment, the circuitry triggers the RACH procedure, and the RACH procedure is triggered in response to beam failure detection for a Serving Cell (e.g., PCell or SCell). The MsgA includes a C-RNTI Media Access Control Element (C-RNTI MAC CE). The MsgA includes an indication of a selected candidate beam. The circuitry monitors for the network response, and the monitoring for the network response includes monitoring for a network response addressed to C-RNTI.

In an exemplary embodiment, the MsgA includes an indication of the cell for which Beam Failure recovery (BFR) is being performed.

In an exemplary embodiment, the circuitry triggers the RACH procedure, and the RACH procedure is triggered in response to a Scheduling Request (SR). The MsgA includes a C-RNTI MAC CE and a Buffer Status Report (BSR) that triggered the SR.

In an exemplary embodiment, the circuitry triggers the RACH procedure, and the RACH procedure is triggered in response to a handover, and the MsgA includes an RRCReconfigurationComplete message. In an exemplary embodiment, the circuitry triggers the RACH procedure, and the RACH procedure is triggered in response to an On-Demand System Information request, and the MsgA includes an RRCSystemInfoRequest message. In an exemplary embodiment, the circuitry triggers the RACH procedure, and the RACH procedure is triggered in response to handover or beam failure detection, and the first apparatus performs a prioritized RACH procedure using prioritized parameter values received by the second apparatus.

In an exemplary embodiment, the prioritized parameters include powerRampingStepHighPriority and scalingFactorBI.

In an exemplary embodiment, the circuitry transmits the MsgA, and transmitting the MsgA includes applying a distance based open loop timing advance value.

In an exemplary embodiment, the circuitry is configured to perform a channel access procedure prior to transmitting the MsgA.

In an exemplary embodiment, an indication of a channel access failure is provided to Media Access Control (MAC), and variables PREAMBLE_TRANSMISSION_COUNTER and PREAMBLE_POWER_RAMPING_COUNTER are not incremented. In an exemplary embodiment, an indication of channel access procedure failures is used to detect consistent Uplink (UL) Listen-Before-Talk (LBT) failures.

In an exemplary embodiment, a system includes a first apparatus and a base station (e.g. gNB 180b). The first apparatus includes circuitry configured to trigger a Random Access Channel (RACH) procedure; select a two-step RACH procedure from among a plurality of RACH procedures as a RACH type to be performed; select a MsgA transmission resource; transmit a MsgA; and monitor for a network response from a second apparatus.

In an exemplary embodiment, a method performed by a first apparatus in a wireless communication system. The method includes: triggering a Random Access Channel (RACH) procedure; selecting a two-step RACH procedure from among a plurality of RACH procedures as a RACH type to be performed; selecting a MsgA transmission resource; transmitting a MsgA; and monitoring for a network response from a second apparatus.

In an exemplary embodiment, a second apparatus is in a wireless communication system. The second apparatus includes circuitry configured to receive a MsgA from a first apparatus; and send a network response to the first apparatus. The first apparatus triggers a Random Access Channel (RACH) procedure, selects a two-step RACH procedure from among a plurality of RACH procedures as a RACH type to be performed, and selects a MsgA transmission resource.

An exemplary embodiment provides a first apparatus in a wireless communication system. The first apparatus includes circuitry configured to identify a at least one of a MAC PDU size and QoS requirement for a wireless device that transmits data in a wireless communication system, and execute a 2-step RACH procedure that is adapted based on the at least one of MAC PDU size and QoS requirement.

In an exemplary embodiment, the circuitry is further configured to perform RACH type selection based on at least one of a network configuration, a DL radio quality, a MsgA payload size, a logical channel and a status of a timeAlignmentTimer.

In an exemplary embodiment, the circuitry is further configured to perform MsgA resource selection for one-to-one, many-to-one and one-to-many mappings between preambles and PUSCH Resource Units.

In an exemplary embodiment, the circuitry is further configured to execute the 2-step RACH including at least one of transmission of a MsgA preamble and a PUSCH, or MsgB/Msg2 reception.

In an exemplary embodiment, the circuitry is further configured to execute the 2-step RACH as part of a beam failure recovery (BFR) operation.

In an exemplary embodiment, the circuitry is further configured to execute the 2-step RACH as part of a beam failure recovery (BFR) operation of an Scell that uses the 2-step RACH.

In an exemplary embodiment, the circuitry is further configured to identify a listen before talk (LBT) failure, and the 2-step RACH is performed with a NR-U device.

In an exemplary embodiment, the circuitry is further configured to perform a channel access procedure for MsgA configurations with TDM-ed preamble and PUSCH.

In an exemplary embodiment, the circuitry is further configured to perform inter-MsgA blocking.

In an exemplary embodiment, the circuitry is further configured to transmit a MsgA preamble and PUSCH on different beams.

An exemplary embodiment provides a first apparatus in a wireless communication system. The first apparatus includes circuitry configured to execute a 2-step RACH procedure in a wireless communication system that includes reception of a MsgA PUSCH reception for an unsynchronized UE.

In an exemplary embodiment, the circuitry is further configured to perform the reception after having determined a distance between the unsynchronized UE and other device by performing an open-loop timing advance value calculation.

In an exemplary embodiment, the circuitry is further configured to perform the reception after determining a timing advance based on a proximity UE timing.

In an exemplary embodiment, the circuitry is further configured to perform the reception after determining a timing advance based on assistance information from a gNB.

In an exemplary embodiment, the circuitry is further configured to execute the 2-step RACH as part of a beam failure recovery (BFR) operation.

In an exemplary embodiment, the circuitry is further configured to execute the 2-step RACH as part of a beam failure recovery (BFR) operation of an Scell that uses the 2-step RACH.

In an exemplary embodiment, the circuitry is further configured to identify a listen before talk (LBT) failure, and the 2-step RACH is performed with a NR-U device.

In an exemplary embodiment, the circuitry is further configured to perform a channel access procedure for MsgA configurations with TDM-ed preamble and PUSCH.

In an exemplary embodiment, the circuitry is further configured to perform inter-MsgA blocking.

In an exemplary embodiment, the circuitry is further configured to transmit a MsgA preamble and PUSCH on different beams.

In an exemplary embodiment, a method is performed by a first apparatus in a wireless communication system, the method comprising: identifying a at least one of a MAC PDU size and QoS requirement for a wireless device that transmits data in a wireless communication system; and executing a 2-step RACH procedure that is adapted based on the at least one of MAC PDU size and QoS requirement.

An exemplary embodiment provides a non-transitory computer readable storage medium having computer-readable instructions tangibly recorded thereon which, when executed by processing circuitry, cause the processing circuitry to perform a message service method on a network, the method comprising: identifying a at least one of a MAC PDU size and QoS requirement for a wireless device that transmits data in a wireless communication system; and executing a 2-step RACH procedure that is adapted based on the at least one of MAC PDU size and QoS requirement.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

The following [1]-[6] are incorporated herein by reference in their entireties:
[1] 3GPP TS 38.300, NR; NR and NG-RAN Overall Description; Stage 2 (Release 15), V15.6.0
[2] 3GPP TS 36.300, (E-UTRAN); Overall description; Stage 2 (Release 15), V15.6.0
[3] 3GPP TR 36.889, Study on Licensed-Assisted Access to Unlicensed Spectrum; (Release 13), V13.0.0
[4] 3GPP TS 36.213, NR; Physical Layer Procedures for Control (Release 15), V15.6.0
[5] 3GPP TS 38.213, NR; Physical Layer Procedures for Control (Release 15), V15.6.0
[6] 3GPP TS 38.211, NR; Physical channels and modulation (Release 15), V15.6.0

What is claimed is:

1. A wireless transmit/receive unit (WTRU) comprising:
a processor and memory, wherein the processor and memory are configured to:
trigger a Random Access Channel (RACH) procedure in response to beam failure detection for a Serving Cell;
select a two-step RACH procedure from among a plurality of RACH procedures as a RACH type to be performed;
receive a first threshold from a network;
select a MsgA transmission resource, wherein the selecting of the MsgA transmission resource comprises selecting a Synchronization Signal Block (SSB) with Synchronization Signal-Reference Signal Received Power (SS-RSRP) above the first threshold, wherein a first preamble group is selected if the SS-RSRP is above a second threshold, and a second preamble group is selected if the SS-RSRP is equal to or below the second threshold;
transmit a MsgA using the MsgA transmission resource, wherein the MsgA comprises a Cell Radio-Network Temporary Identifier (C-RNTI) Media Access Control (MAC) Control Element (CE) and an indication of a selected candidate beam; and
monitor for a network response from a network for a network response addressed to the C-RNTI.

2. The WTRU of claim 1, wherein the processor and memory are configured to:
receive a third threshold from the network; and
select the two-step RACH procedure as the RACH type based on a downlink (DL) signal quality being above the third threshold.

3. The WTRU of claim 2, wherein the DL signal quality is Synchronization Signal-Reference Signal Received Power (SS-RSRP) or Channel State Information-Reference Signal Received Power (CSI-RSRP).

4. The WTRU of claim 1, wherein the processor and memory are configured to:
select the two-step RACH procedure as the RACH type based on a logical channel being associated with a scheduling request that triggered the RACH procedure; and
receive, from the network, a mapping between a logical channel and the RACH type.

5. The WTRU of claim 1, wherein the processor and memory are configured to select a Random Access Preamble randomly from Random Access Preambles associated with the selected SSB to select the MsgA transmission resource.

6. The WTRU of claim 1, wherein the processor and memory are configured to select a preamble group based on the SS-RSRP to select the MsgA transmission resource, and wherein the WTRU receives the second threshold from the network.

7. The WTRU of claim 1, wherein the processor and memory are configured to monitor for the network response, and the monitoring for the network response comprises monitoring for a network response addressed to msgB-Radio Network Temporary Identifier (msgB-RNTI).

8. The WTRU of claim 1, wherein the processor and memory are configured to:
receive a fourth threshold from the network; and
perform a four-step RACH procedure when a number of unsuccessful attempts of the two-step RACH procedure is equal to the fourth threshold.

9. The WTRU of claim 1, wherein the MsgA comprises an indication of the cell for which Beam Failure recovery (BFR) is being performed.

10. The WTRU of claim 1, wherein the processor and memory are configured to trigger the RACH procedure, and the RACH procedure is triggered in response to a Scheduling Request (SR),
wherein the MsgA comprises a Buffer Status Report (BSR) that triggered the SR.

11. The WTRU of claim 1, wherein the processor and memory trigger the RACH procedure, and the RACH procedure is triggered in response to a handover, and the MsgA comprises an RRCReconfigurationComplete message; or
the processor and memory trigger the RACH procedure, and the RACH procedure is triggered in response to an On-Demand System Information request, and the MsgA comprises an RRCSystemInfoRequest message; or
the processor and memory trigger the RACH procedure, and the RACH procedure is triggered in response to handover or beam failure detection, and the WTRU performs a prioritized RACH procedure using prioritized parameter values received by the network.

12. The WTRU of claim 11, wherein the prioritized parameters include powerRampingStepHighPriority and scalingFactorBI.

13. The WTRU of claim 1, wherein the processor and memory are configured to transmit the MsgA, and transmitting the MsgA comprises applying a distance based open loop timing advance value.

14. The WTRU of claim 1, wherein the processor and memory are configured to perform a channel access procedure prior to transmitting the MsgA.

15. The WTRU of claim 14, wherein
an indication of a channel access failure is provided to Media Access Control (MAC), and variables PREAMBLE_TRANSMISSION_COUNTER and PREAMBLE_POWER_RAMPING_COUNTER are not incremented; or an indication of channel access procedure failures is used to detect Uplink (UL) Listen-Before-Talk (LBT) failures.

16. A method performed by a wireless transmit/receive unit (WTRU), the method comprising:
triggering a Random Access Channel (RACH) procedure in response to beam failure detection for a Serving Cell;
selecting a two-step RACH procedure from among a plurality of RACH procedures as a RACH type to be performed;
receiving a first threshold from a network;
selecting a MsgA transmission resource, wherein the selecting of the MsgA transmission resource comprises selecting a Synchronization Signal Block (SSB) with Synchronization Signal-Reference Signal Received Power (SS-RSRP) above the first threshold, wherein a first preamble group is selected if the SS-RSRP is above a second threshold, and a second preamble group is selected if the SS-RSRP is equal to or below the second threshold;
transmitting a MsgA using the MsgA transmission resource, wherein the MsgA comprises a Cell Radio-Network Temporary Identifier (C-RNTI) Media Access Control (MAC) Control Element (CE), and an indication of a selected candidate beam; and
monitoring for a network response from a network for a network response addressed to the C-RNTI.

17. A wireless transmit/receive unit (WTRU) comprising:
a processor and memory, wherein the processor and memory are configured to:
trigger a Random Access Channel (RACH) procedure;
select a two-step RACH procedure from among a plurality of RACH procedures as a RACH type to be performed;
receive a threshold from a network;
select a MsgA transmission resource based on a Synchronization Signal Block (SSB) with Synchronization Signal-Reference Signal Received Power (SS-RSRP) above the threshold, wherein a first preamble group is selected if the SS-RSRP is above the threshold, and a second preamble group is selected if the SS-RSRP is equal to or below the threshold;
transmit a MsgA using the MsgA transmission resource; and
monitor for a network response from the network.

* * * * *